United States Patent
Patterson et al.

(10) Patent No.: US 7,890,284 B2
(45) Date of Patent: Feb. 15, 2011

(54) IDENTIFICATION SYSTEM AND METHOD FOR RECOGNIZING ANY ONE OF A NUMBER OF DIFFERENT TYPES OF DEVICES

(75) Inventors: Stuart Patterson, Walpole, MA (US); Frederick Loeb, Scituate, MA (US); John Howley, Milton, MA (US); Ludgero Leonardo, Stoughton, MA (US)

(73) Assignee: Analog Devices, Inc., Norwood, MA (US)

( * ) Notice: Subject to any disclaimer, the term of this patent is extended or adjusted under 35 U.S.C. 154(b) by 1985 days.

(21) Appl. No.: 10/464,951

(22) Filed: Jun. 19, 2003

(65) Prior Publication Data

US 2004/0081099 A1    Apr. 29, 2004

Related U.S. Application Data

(60) Provisional application No. 60/391,119, filed on Jun. 24, 2002.

(51) Int. Cl.
*G06F 3/00* (2006.01)

(52) U.S. Cl. .................. 702/117; 702/116; 702/118; 702/120

(58) Field of Classification Search .......... 702/108, 702/115, 141, 150, 182–184, 116–118, 120; 307/125; 455/210; 710/1, 69; 381/5–7; 714/49; 324/202
See application file for complete search history.

(56) References Cited

U.S. PATENT DOCUMENTS

| | | | |
|---|---|---|---|
| 4,737,657 A | 4/1988 | Jatko et al. .................. 307/85 |
| 4,792,986 A * | 12/1988 | Garner et al. ............. 455/90.2 |
| 4,972,457 A | 11/1990 | O'Sullivan | |
| 5,259,025 A | 11/1993 | Monroe et al. | |
| 5,278,904 A | 1/1994 | Servi | |
| 5,742,685 A | 4/1998 | Berson et al. | |
| 5,859,522 A | 1/1999 | Theobald | |
| 6,054,846 A | 4/2000 | Castleman | |
| 6,069,960 A | 5/2000 | Mizukami et al. | |
| 6,185,627 B1 * | 2/2001 | Baker et al. ................ 710/1 |

(Continued)

FOREIGN PATENT DOCUMENTS

EP    1133185 A2    9/2001

(Continued)

OTHER PUBLICATIONS

Microsoft Corp., Analog Audio Classification Using Device Impedance Characteristics, Version 1.0 (Apr. 16, 2002).

(Continued)

*Primary Examiner*—Eliseo Ramos Feliciano
*Assistant Examiner*—Felix E Suarez
(74) *Attorney, Agent, or Firm*—Bingham McCutchen LLP

(57) ABSTRACT

An identification system and method for recognizing a device as one of a plurality of different types of devices connected to at least one terminal of an information handling system includes supplying a test signal to a device in a test mode; measuring an electrical characteristic of the device in response to the test signal being applied to the device in the test mode; and matching a representation of the electrical characteristic of the device with representations of the electrical characteristics of the plurality of devices for recognizing the device connected to the terminal as one of the plurality of different devices.

58 Claims, 18 Drawing Sheets

U.S. PATENT DOCUMENTS

| | | | |
|---|---|---|---|
| 6,339,831 B1 | 1/2002 | Sugawara et al. ............... 714/3 |
| 6,473,332 B1* | 10/2002 | Ignatiev et al. ............... 365/148 |
| 6,498,791 B2 | 12/2002 | Pickett et al. |
| 6,509,659 B1 | 1/2003 | Carroll et al. |
| 6,643,364 B1 | 11/2003 | Takahashi |
| 6,654,840 B1 | 11/2003 | Gendo et al. ................ 710/300 |
| 6,684,262 B1 | 1/2004 | Miller et al. .................... 710/8 |
| 6,856,046 B1* | 2/2005 | Scarlett et al. ............... 307/125 |
| 6,859,538 B1 | 2/2005 | Voltz |
| 6,862,636 B2* | 3/2005 | Young ......................... 710/69 |
| 6,877,008 B1 | 4/2005 | Kirkpatrick et al. |
| 6,877,043 B2 | 4/2005 | Mallory et al. |
| 6,970,752 B1 | 11/2005 | Lim et al. |
| 7,002,265 B2 | 2/2006 | Potega |
| 7,024,539 B2 | 4/2006 | Bresemann et al. |
| 7,039,205 B1 | 5/2006 | Carter et al. |
| 7,099,481 B2 | 8/2006 | Baker et al. |
| 7,110,799 B1* | 9/2006 | Willins et al. ............ 455/575.2 |
| 7,286,678 B1 | 10/2007 | Bachler et al. |
| 7,601,032 B2 | 10/2009 | Labarca et al. |
| 2002/0133245 A1 | 9/2002 | Lee et al. |
| 2002/0172371 A1 | 11/2002 | Baker et al. |
| 2003/0002988 A1 | 1/2003 | Jackson et al. |
| 2003/0052712 A1* | 3/2003 | Comer ......................... 326/38 |
| 2004/0081099 A1 | 4/2004 | Patterson et al. |
| 2004/0101144 A1 | 5/2004 | Lee |
| 2004/0122541 A1 | 6/2004 | DiSanza et al. |
| 2004/0259435 A1 | 12/2004 | Stephan et al. |
| 2004/0260846 A1 | 12/2004 | Stephan et al. |
| 2005/0086175 A1 | 4/2005 | Brique et al. |

FOREIGN PATENT DOCUMENTS

| | | | |
|---|---|---|---|
| EP | 1191770 A2 | 3/2002 |
| EP | 1315361 A1 | 5/2003 |
| JP | 4079721 A | 3/1992 |
| JP | 06-018635 A | 1/1994 |
| WO | WO-99062180 | 12/1999 |
| WO | WO-2004057711 A1 | 7/2004 |
| WO | WO-2004079873 A1 | 9/2004 |

OTHER PUBLICATIONS

Decision of Rejection in Japanese Patent Application No. 2004-516222, mailed Jun. 12, 2007 (2 pages).

Decision of Rejection in Japanese Patent Application No. 2007-527790, mailed Mar. 3, 2009 (2 pages).

Intel Corporation, "Audio Codec '97," (Rev 2.3, Apr. 2002).

International Preliminary Report on Patentability in International Patent Application No. PCT/US2005/020680, mailed Sep. 18, 2008 (8 pages).

International Preliminary Report on Patentability in International Patent Application No. PCT/US2005/020687, mailed Jun. 7, 2007 (7 pages).

International Search Report and Written Opinion in International Patent Application No. PCT/US2005/020680, mailed Jul. 30, 2008 (10 pages).

International Search Report and Written Opinion in International Patent Application No. PCT/US2005/020687, mailed Apr. 26, 2007 (8 pages).

International Search Report in International Patent Application No. PCT/US03/19971, mailed May 4, 2004 (4 pages).

Microsoft Corporation, "Analog Audio Classification Using Device Impedance Characteristics," Version 1.0 (Apr. 16, 2002).

Office Action in Chinese Patent Application No. 200580016297.X, mailed Oct. 24, 2008 (6 pages).

Office Action in Japanese Patent Application No. 2004-516222, mailed Nov. 21, 2006 (3 pages).

Office Action in Japanese Patent Application No. 2007-527790, mailed Aug. 5, 2008 (4 pages).

Office Action in Japanese Patent Application No. 2007-527791, mailed Aug. 5, 2008 (2 pages).

Supplementary European Search Report in European Patent Application No. 03761308.0, mailed May 15, 2009 (4 pages).

Examination Report issued for European Patent Application No. 05760317.7, mailed Jul. 19, 2010 (5 pages).

English Translation of Official Inquiry in Japanese Patent Application No. 2004-516222, mailed Oct. 13, 2009 (3 pages).

Supplementary European Search Report in European Patent Application No. 05760317.7, mailed Oct. 20, 2009 (3 pages).

Supplementary European Search Report in European Patent Application No. 05759775.9, mailed Nov. 12, 2009 (3 pages).

Examination Report in European Patent Application No. 05759775.9, mailed Apr. 21, 2010 (4 pages).

Examination Report in European Patent Application No. 03761308.0, mailed Aug. 21, 2009 (4 pages).

English translation of Appeal Decision of Rejection in Japanese Patent Application No. 2004-516222, mailed Jun. 22, 2010 (10 pages).

Office Action in Chinese Patent Application No. 200580016296.5, mailed Oct. 27, 2010 (9 pages).

* cited by examiner

JACK SENSING TABLE

|  | JS1 | JS3 | JS0 | JS4 |
|---|---|---|---|---|
| SPEAKERS (Zin=10K) | 0 | 0 | 1 | 1 |
| HEADPHONES (Zin=32 ohms) | 1 | 0 | 1 | 1 |
| MONO HEADSET (Zin=32 ohms) | 1 | 0 | 0 | 1 |
| SPDIF (75 ohms) | 1 | 1 | 0 | 1 |
| TELECOM HS (MIC=tip HP=ring) | 0 | 1 | 0 | 1 |
| MICROPHONE | 0 | 0 | 0 | 1 |
| NOTHING | 0 | 0 | 1 | 0 |

IDENTIFICATION SYSTEM AND METHOD FOR RECOGNIZING ANY ONE OF A NUMBER OF DIFFERENT TYPES OF DEVICES

RELATED APPLICATIONS

This application claims priority of U.S. Provisional Application Ser. No. 60/391,119 filed Jun. 24, 2002.

FIELD OF THE INVENTION

This invention relates to an identification system for recognizing any one of a number of different types of devices at the terminal of an information handling system, and even further to the ability to reconfigure the terminal to service the identified device.

BACKGROUND OF THE INVENTION

Audio processing has become an important function in the field of personal computers. Computers contain dedicated audio processing devices, typically referred to as audio codecs, which connect to external audio transducers and devices. One of the primary functions of the audio codec is to convert both input and output audio signals to and from the internal digital formats of the computer and the, typically, analog format of the external devices.

One method of connecting external audio devices to the computer is to use a 3.5 mm or similar stereo audio jack. Each computer contains several jacks, which have typically been dedicated to a single function each, such as stereo line out for speakers, microphone input, and line input. With the increase in multimedia formats available today there is a need for increasing the number of input and output audio devices that the computer can support without increasing the current number of jacks on the computer which would increase the cost of the system. Also the probability of the computer user incorrectly connecting external devices to the wrong jacks increases dramatically leading to costly support calls.

Identification of external devices and moreover internal reconfiguration to accommodate input from or output to external devices is even more critical with respect to smaller, portable devices such as cell phones and PDAs where often only one connection or jack can be provided to receive a plug. The problem is further compounded because video as well as audio inputs/outputs are proliferating. Classical jack sensing has been available which detects plug in and out events at the jack. And, the detection of those events have been used to automatically perform other actions, e.g. the entry of an earphone plug into a jack automatically mutes the speakers, the recognition of a digital or analog speaker converts the output to the speakers to the proper choice of analog or digital signal. U.S. Pat. No. 6,185,627 is incorporated herein by this reference.

BRIEF SUMMARY OF THE INVENTION

It is therefore an object of this invention to provide an improved identification system for recognizing any one of a number of different types of devices.

It is a further object of this invention to provide such an improved identification system which can be reconfigured to adapt its function to match the recognized device.

It is a further object of this invention to provide such an improved identification system which can recognize or recognize and adapt to different devices whether input or output devices.

It is a further object of this invention to provide such an improved identification system which can recognize a device in a number of ways including impedance characteristics and spectral signature.

It is a further object of this invention to provide such an improved identification system which can distinguish mono and stereo input and output devices and detect balanced and unbalanced loads.

It is a further object of this invention to provide such an improved identification system which can learn to recognize new devices.

It is a further object of this invention to provide such an improved identification system which can service a number of connectors or terminals and can even do so using the same excitation and analysis circuits to save on cost.

It is a further object of this invention to provide such an improved identification system which uses a programmable current source that permits the use of a less sensitive and thus less expensive response analyzer.

It is a further object of this invention to provide event detector circuitry which correctly identifies a plug-in or plug-out event even when multiple jacks are employed and even if non-isolated switches are used.

The invention results from the realization that a device connected to the connectors, terminals or jacks of an information handling system such as a computer system or sound system can be automatically identified by matching it with the electrical characteristics such as impedance or frequency response of a group of known devices using hardware and/or software, decision trees or stored look up tables and further once recognized, the identity can be used to configure the terminal for a plurality of different input and output devices such as speakers, microphones, phonographs, and tape and CD players, and other audio and video devices.

This invention features an identification system for recognizing a device as one of a plurality of different types of devices connected to at least one terminal of an information handling system. There is an excitation circuit for supplying a test signal to a device in a test mode and a response analyzer circuit responsive to the test signal being applied to the device in the test mode for measuring an electrical characteristic of the device. An identification circuit responds to the measured electrical characteristic of the device for matching a representation of the electrical characteristic of the device with representations of the electrical characteristics of the plurality of devices for recognizing the device connected to the terminal as one of the plurality of different devices.

In a preferred embodiment, the excitation circuit may include a current source. The current source may provide current to the device or it may sink current from the device. The excitation circuit may include an excitation switching circuit for selectively connecting the current source to the terminal. The current source may include a plurality of current source units. The response analyzer circuit may include a sample and hold circuit for sensing the voltage of the device after the current source is connected to the device. The response analyzer circuit may include an analog to digital converter responsive to the sample and hold circuit. The identification circuit may employ a decision tree for matching the representation of the electrical characteristic of the device with those of the plurality of different devices. The identification circuit may include a storage device for storing representations of the characteristics of the plurality of devices for matching with the representation of the characteristic of the device. There may be a reconfiguration circuit connected to the terminal and responsive to the identification of the device for reconfiguring to adapt to the identified device. The reconfiguration circuit may include input and output amplifiers and a reconfiguring switching circuit for selectively connecting the amplifiers to the terminal. The reconfiguration circuit may include input and output amplifiers having enable inputs which can selectively transition the amplifiers between low-on impedance and high-off impedance.

There may be an event detector for detecting the presence and absence of a device connected to a terminal. In one example, there are, multiple terminals and the event detector includes a resistor ladder network connected between a node and the terminals for conditioning the voltage at the node to vary depending on whether devices are connected to one or more of the terminals and a comparison circuit for detecting whether the voltage at the node has changed. Typically, the comparison circuit is an analog to digital converter and the resistive ladder network includes a differently valued resistors connected,between each terminal and the node. In another example, the multiple terminals are not isolated and the event detector further includes means for discriminating between a voltage change at the node due to the presence of an audio signal and a terminal plug-in or plug-out event. In one embodiment the means for discriminating includes a logic circuit responsive to a timer for detecting whether the voltage change at the node is stable.

The electrical characteristic may be impedance or it may be frequency response and the response analyzer circuit may include a frequency response analyzer. There may be a number of terminals and a number of excitation switching circuits for selectively connecting the excitation circuit with each of the terminals. The terminal may include a tip and a ring jack. The excitation circuit may supply a test signal to the tip contact and the response analyzer may respond to the ring contact. The terminal may include a tip and ring jack and the excitation circuit may supply a test signal to the ring contact and the response analyzer circuit may be responsive to the tip contact. The response analyzer circuit may include an analyzer switching circuit for selectively connecting the sample and hold circuit to the terminal. There may be a number of terminals and analyzer switching circuits for selectively connecting the response analyzer circuit with each of the terminals. The excitation circuit may include a programmable current source responsive to the response analyzer circuit for selectively applying a number of different current levels to the device.

The invention also features an identification system for recognizing a device as one of a plurality of different types of devices connected to at least one terminal of an information handling system. There is an excitation circuit for supplying a test signal to a device in a test mode and a response analyzer circuit responsive to the test signal being applied to the device in the test mode for measuring an electrical characteristic of the device. An identification circuit responsive to the measured electrical characteristic of the device matches a representation of the electrical characteristic of the device with representations of the electrical characteristics of the plurality of devices for recognizing the device connected to the terminal as one of the plurality of different devices. A reconfiguration circuit connected to the terminal may be responsive to the identification of that device for reconfiguring to adapt to the identified device.

The excitation circuit may include a current source. The current source may provide current to the device. The current source may sink current from the device. The excitation circuit may include an excitation switching circuit for selectively connecting the current source to the terminal. The current source may include a plurality of current source units. The response analyzer circuit may include a sample and hold circuit for sensing the voltage of the device after the current source is connected to the device. The response analyzer circuit may include an analog to digital converter responsive to the sample and hold circuit. The identification circuit may include a decision tree for matching the representation of the electrical characteristic of the device with those of the plurality of different devices. The identification circuit may include a storage device for storing representations of the characteristics of the plurality of devices for matching with the representation of the characteristic of the device. The reconfiguration circuit may include input and output amplifiers and a reconfiguring switching circuit for selectively connecting the amplifiers to the terminal. The reconfiguration circuit may include input and output amplifiers having enable inputs which can selectively transition the amplifiers between low-on impedance and high-off impedance. There may be an event detector for detecting the presence and absence of a device connected to the terminal. The electrical characteristic being monitored may be impedance or it may be frequency response and the response analyzer may include a frequency response analyzer. There may be a number of terminals and a number of excitation switching circuits for selectively connecting the excitation circuit with each of the terminals. The terminal may include a tip and ring jack and the excitation circuit may supply a test signal to the tip contact and the response analyzer circuit may respond to the ring contact. Conversely, the terminal may include a tip and ring jack and the excitation circuit may supply a test signal to the ring contact and the response analyzer may respond to the tip contact. The response analyzer circuit may include an analyzer switching circuit for selectively connecting the sample and hold circuit to the terminal. There may be a number of terminals and analyzer switching circuits for selectively connecting the response analyzer circuit with each of the terminals. The excitation circuit may include a programmable current source responsive to the response analyzer circuit for selectively applying a number of different current levels to the device.

The invention also features an identification method for recognizing a device as one of a plurality of different types of devices connected to at least one terminal of an information handling system including supplying a test signal to a device in a test mode and measuring the electrical characteristic of the device in response to the test signal being applied to the device in the test mode. A representation of the electrical characteristic of the device is matched with the representations of the electrical characteristics of the plurality of devices for recognizing the device connected to the terminal as one of the plurality of different devices for recognizing the device connected to the terminal as one of the plurality of different devices.

In a preferred embodiment, matching representation of the electrical characteristic of the device with those of the plurality of different devices may employ a decision tree. The storage device may store representations of the characteristics of the plurality of devices for matching with a representation of the characteristic of the device. The system may respond to the identification of a device by reconfiguring a terminal to adapt to the identified device. There may be an event detector for detecting the presence and absence of a device connected to the terminal. The electrical characteristic may be impedance or it may be frequency response. The terminal may include a tip and ring jack and the test signal may be applied to the tip contact and the response received from the ring contact. Or the terminal may include a tip and ring jack and the test signal may be applied to the ring contact and the response may be received from the tip contact. The excitation circuit may include a programmable current source responsive to the response analyzer circuit for selectively applying a number of different current levels to the device.

A system for detecting a device plug-in or plug-out event for a plurality of terminals, in accordance with this invention, includes a resistive ladder network connected between a node and the terminals for conditioning the voltage at the node to vary depending on whether devices are connected to one or more of the terminals. A comparison circuit then detects whether the voltage at the node has changed.

In one example the comparison circuit is an analog-to-digital converter and the resistive ladder network includes a differently valued resistor connected between each terminal and the node. When the multiple terminals are not isolated, the event detector may further include a logic circuit configured to discriminate between a voltage change at the node due to the presence of an audio signal and a terminal plug-in or plug-out event One system for detecting a device plug-in or plug-out event for a plurality of terminals includes a resistive ladder network connected between a node and the terminals for conditioning the voltage at the node to vary depending on whether devices are connected to one or more of the terminals, a comparison circuit for detecting whether the voltage at the node has changed and a logic circuit, configured to discriminate between a voltage change at the node not due to a terminal plug-in or plug-out event (due to noise or an audio signal, for example) and a voltage change at the node that is due to a terminal plug-in or plug-out event.

BRIEF DESCRIPTION OF THE DRAWINGS

Other objects, features and advantages will occur to those skilled in the art from the following description of a preferred embodiment and the accompanying drawings, in which:

FIG. 10 is a chart of a stored look up table for identifying a device according to this invention;

DISCLOSURE OF THE PREFERRED EMBODIMENT

Figure 1:
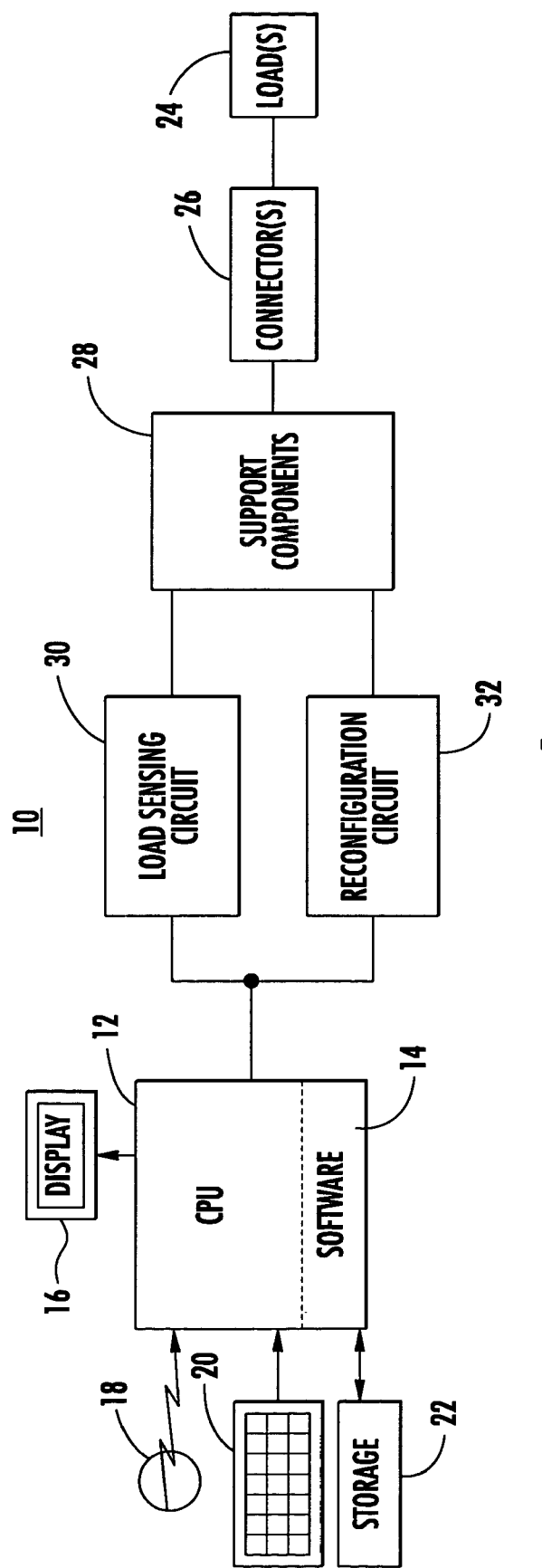
FIG. 1 is a schematic block diagram of an information handling system with identification and reconfiguration circuits according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 an information handling system 10 including a computer 12 containing software 14 and having conventional associated devices such as display 16, mouse 18, keyboard 20, and storage device 22 which may be internal or external input/output devices. In accordance with this system, the load or loads 24 including various input/output devices such as speakers, microphones, phonographs, tape and CD players and recorders and all manner of audio and visual input/output devices whether internal or external are connected through a connector or connectors 26 which may be any form of terminal such as jacks for example which are interconnected through support components 28 of conventional nature which are identified in accordance with this invention. In accordance with this invention load sensing circuit 30 sends out test signals to loads 24 through connectors 26 and analyzes the responses to determine the identity of each of the loads at each of jacks or connectors 26. In an enhanced version of the invention, reconfiguration circuit 32 responds to the identification of a particular load at a particular jack by load sensing circuit 30 and reconfigures the circuits associated with that connector so that they are properly adapted for the identified load, whether it be input or output, audio or video. In one embodiment both circuits 30 and 32 are a part of Codec 11 but that is not a necessary limitation of this invention.

Figure 2:
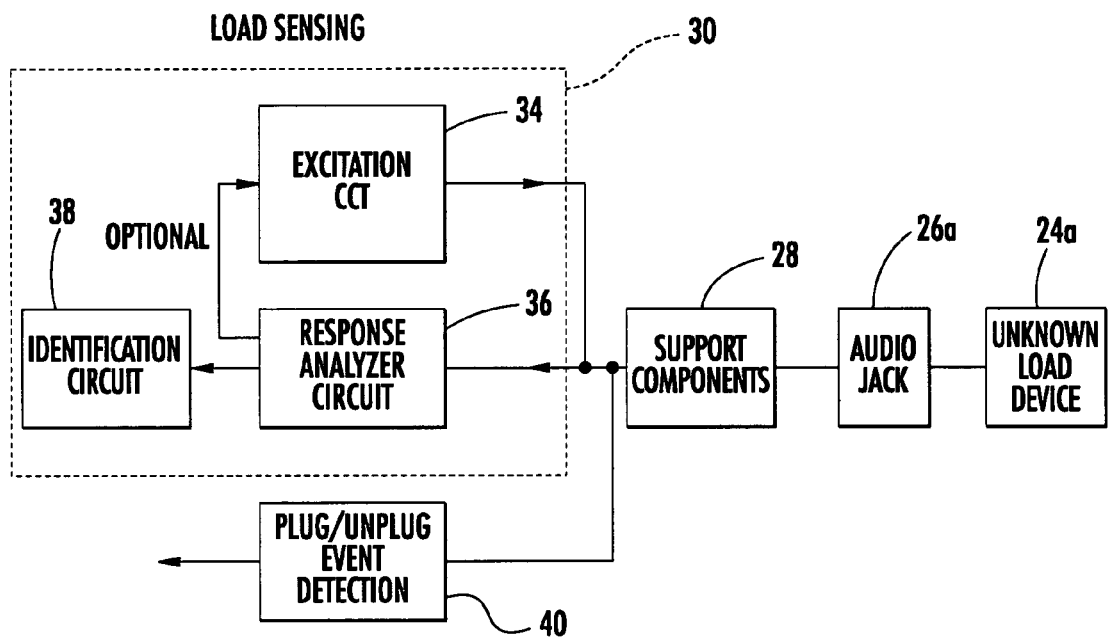
FIG. 2 is a more detailed schematic block diagram of the identification circuit along with a plug event detection circuit.

Load sensing circuit 30, FIG. 2, includes excitation circuit 34, response analyzer 36, and identification circuit 38. Also shown in FIG. 2 is a classic plug/unplug event detection circuit 40. Additional embodiments for this circuit are discussed below with reference to FIGS. 16 and 17. The connectors are indicated as audio jacks 26a in FIG. 2 and the unknown device 24a as an audio type of device. Excitation circuit 34 sends out a test signal through support components 28 and jack 26a to the unknown load device 24a. The response to that test signal is sensed by response analyzer circuit 36 and delivered to identification circuit 38. The response analyzer may be sensing impedance or frequency response, that is impedance or some other characteristic over a range of frequencies. Whatever the characteristic is, it is submitted to identification circuit 38 which then matches it with one of a number of characteristics of known loads to determine which load this might be. In more advanced embodiments, as discussed with reference to the software flow charts in FIGS. 12-15, if a match does not occur the user interface software may ask for a user ID of the device plugged into the particular jack and then add it to its stored lookup table or modify the decision logic tree so that this new device would now become a part of the known devices for future matchings.

Figure 3:
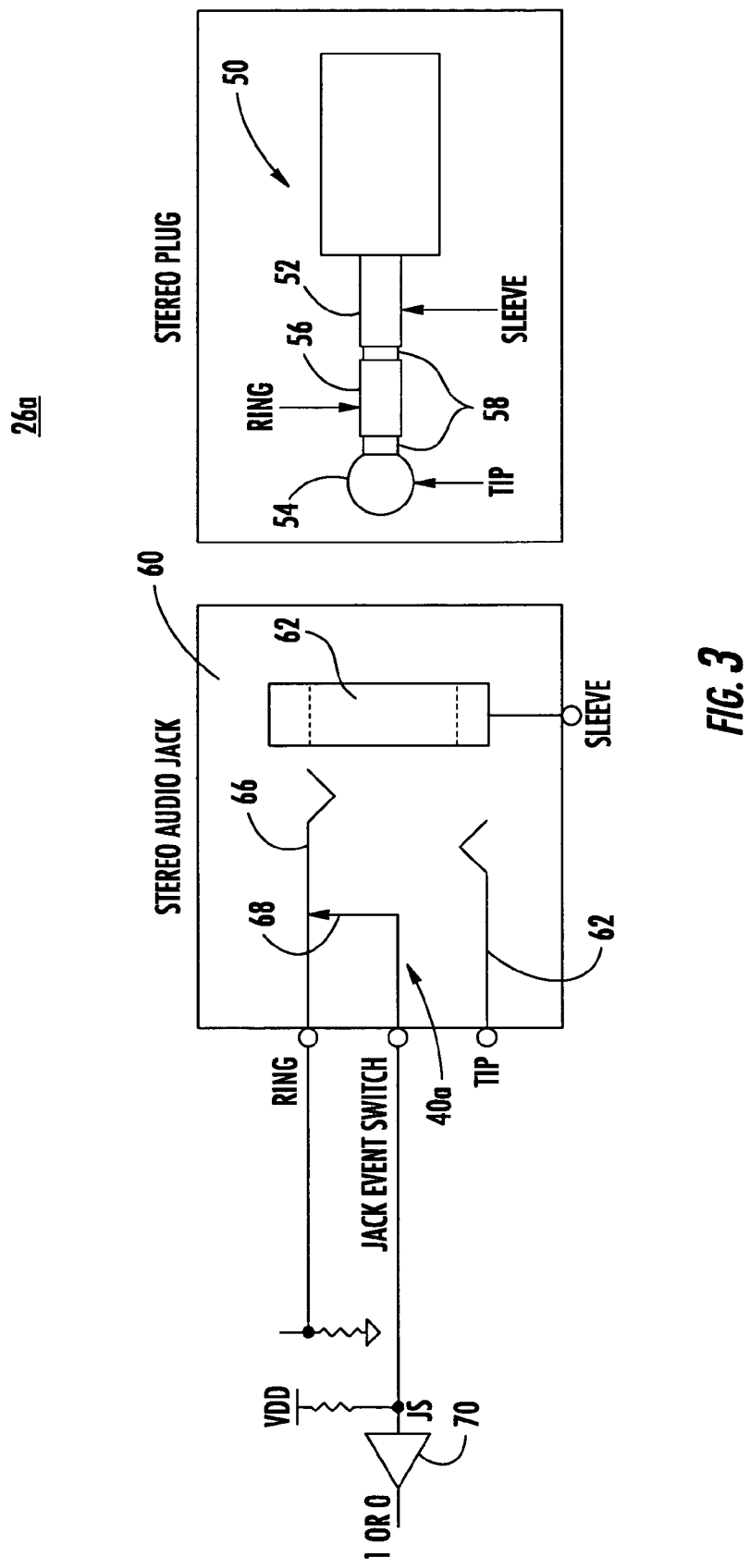
FIG. 3 is a schematic sectional view of a conventional audio jack and plug.

Audio jack 26a, FIG. 3, is a classical audio jack including plug 50 having a sleeve 52, tip contact 54 and ring contact 56 separated by suitable insulators 58. Engaging with plug 50 is jack 60 which typically includes sleeve 62, tip contact 64, and ring contact 66. Plug/unplug event detection circuit 40 of FIG. 2 may include a simple switch 40a, as shown in FIG. 3, whereby when plug 50 is inserted through sleeve 62 its tip 54 and ring 56 portions will drive ring contact in jack 60 away from jack event switch contact 68 thereby providing a signal to amplifier 70 that can be used to inform the controlling software or hardware that a plug is or is not present in the jack. Additional event detector circuitry embodiments are discussed below with reference to FIGS. 16 and 17.

Figure 4:
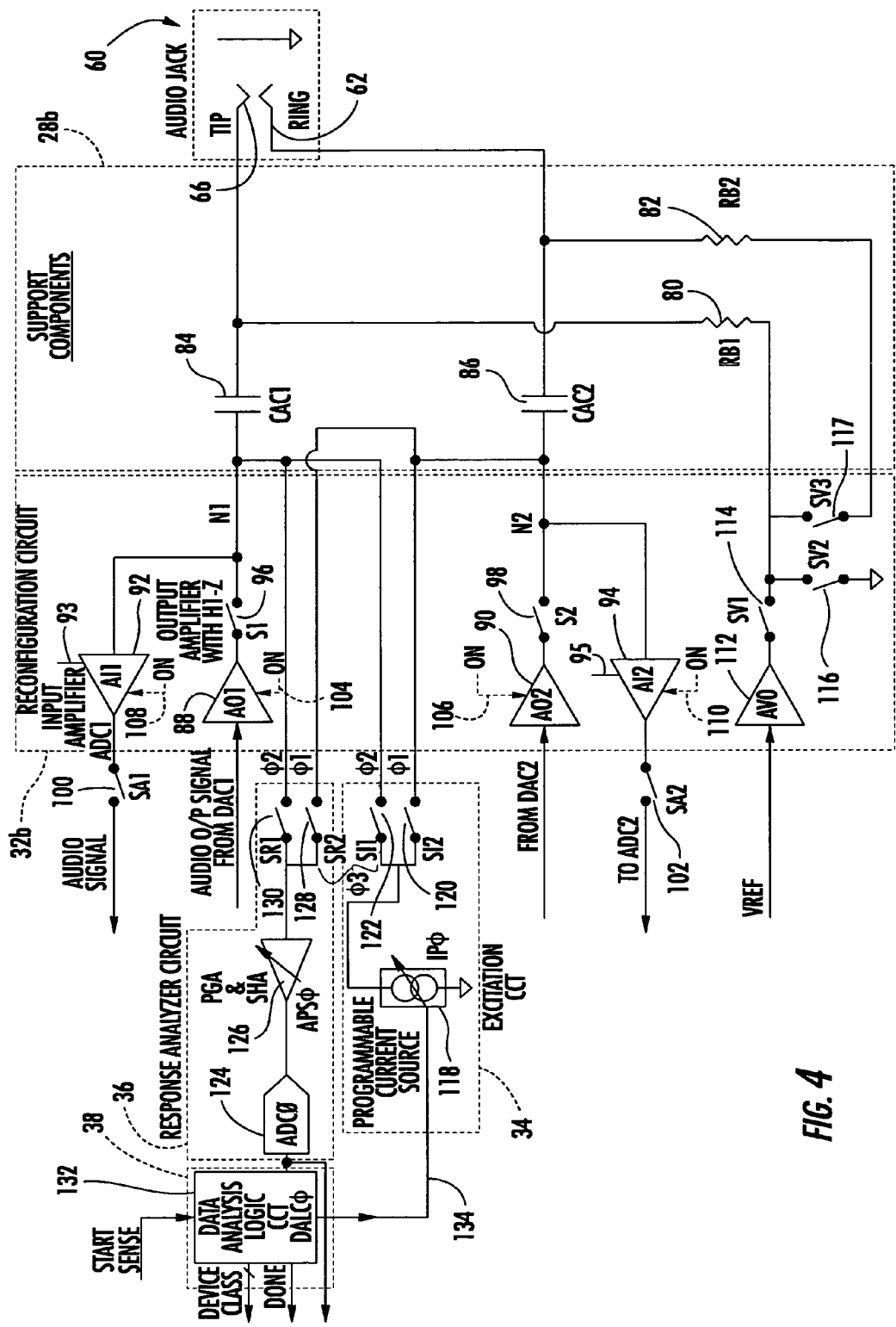
FIG. 4 is a more detailed schematic diagram of the response analyzer circuit, excitation circuit, identification circuit, reconfiguration circuit, and support components of FIGS. 1 and 2.

In one embodiment, as shown in FIG. 4, support components 28b may include bias resistors 80 and 82 and capacitors 84 and 86. Reconfiguration circuit 32b may include output amplifiers 88 and 90 as well as input amplifiers 92 and 94 with gain controls 93 and 95, respectively, which will be enabled dependent upon whether the unknown device at the terminal or jack is identified as an input or output device. The connection or disconnection of amplifiers of 88, 90, 92, and 94 may be effected simply by the use of switches 96, 98, 100, 102, although more sophisticated arrangements may be used. For example, each of the amplifiers 88-94 may have an enable input 104, 106, 108, 110 which enables the amplifier to present a high impedance in the off state and a low impedance in the on state. Another amplifier 112 may be used to drive bias resistors 80 and 82 when switch 114 is closed. Switch 116 may be made available to ground bias resistors 80 and 82 to avoid crosstalk.

Excitation circuit 34 includes a current source 118 for example a current mode DAC which may be programmable. That is, it may be directed to put out different levels of current in three, four, or any number of steps as the test current. Typically, the lowest current is delivered to the unknown load device first and if the returning input is insufficient for analysis, the data analysis logic circuit 132 will step the current source 118 to the next level. This allows the use of a less sensitive and thus less expensive response analyzer circuit 36. This will continue until the return signal is sufficient for analysis. Excitation circuit 34 also includes switches 120 and 122. When switch 120 is closed the test signal is delivered through capacitor 86 to the ring contact 62. When switch 122 is closed, the test current is instead delivered through capacitor 84 to the tip contact 66. Response analyzer 36 includes analog to digital converter 124, preferably a programmable amplifier and sample and hold circuit 126 along with switches 128 and 130. Identification circuit 38 includes data analysis logic circuit 132.

In operation, capacitors 84 and 86 are charged, typically through input or output amplifiers 88 and 90 with switches 96 and 98 closed. Once they are charged switches 96 and 98 are open. Then a signal on line 134 from data analysis logic circuit 132 actuates current source 118 to provide its first lowest level of current through closed switch 120 and capacitor 86. This is phase 1 operation. In phase 1, switch 128 is also closed so that the effect of the test current on the voltage on capacitor 86 is sensed through switch 128 by amplifier 126. This signal is converted to a digital signal and submitted to the data analysis logic circuit 132. In phase 2 switches 122 and 130 are closed so that now the test current is delivered to capacitor 84 and the effect of that current on the voltage stored on capacitor 84 is sensed through switch 130 by amplifier 136 and again the signal is converted to digital form by ADC converter 124 and delivered to data analysis logic circuit 132.

In phase 3 switch 122 may be closed so that a current is supplied to capacitor 84 which is connected to tip 166 while the closure of switch 128 means that the sensing is done at capacitor 86 which is connected to ring 62. Thus, the system in phase 1 checks one of the tip and ring, in phase 2 it checks the other, and in phase 3 it checks through both the tip and ring. It should be understood that while in phase 3 the tip is provided with current and the sensing is of the ring, the converse can be done alternatively, or both could be done by adding a phase 4. Once the device is identified in data analysis logic circuit 132, the proper signals can be developed to operate switches 96, 98, 100, and 102 to connect the proper ones of the input and output amplifiers to the tip and ring to accommodate the type and nature of the device identified as connected to jack 60.

The reconfiguration circuit can adapt to microphone (stereo or mono) by closing switch 114 and opening switch 116 thereby providing a bias current to the microphone through resistors 80 and 82. Amplifier 92 would buffer the incoming signal for further processing such as digitizing by an audio ADC. In the case of a stereo microphone detected, amplifier 94 would also be enabled at 110 in order to buffer the second signal of the stereo pair for similar processing. In both cases amplifiers 88 and 90 would be rendered high impedance to nodes N1 and N2 by either opening switches 96 and 98 or disabling them with controls 104 and 106. If speakers were detected, the bias provided by amplifier 112 and resistors 80 and 82 would be undesirable. For this reason switch 114 would be opened and switch 116 would be closed thereby eliminating any unwanted bias and also eliminating any serious crosstalk path, between signals at tip 66 and ring 60 through resistors 80 and 82. The output signals intended for the speakers connected to audio jack 60 would be driven by amplifiers 88 and 90 which would be enabled by controls 104 and 106, if present, and connected to nodes N1 and N2 either directly or through switches 96 and 98 which would be closed, if present.

If a typical communication headset is detected connected to audio jack 60 then switch 114 would be closed and switches 116 and 117 would be open. This would provide bias to the microphone of the headset connected to tip 66 through resistor 80. The input signal would coupled through capacitor 84 to amplifier 92 which would be enabled by control 108 and switch 100 would be closed to connect the incoming audio signal to further processing circuits. Amplifier 88 would be disabled by control 104 and/or switch 96 would be open, if present. The output signal to be delivered to the earpiece connected to ring terminal 62 is provided through capacitor 86 using amplifier 90 which is connected by closing switch 98, if present, and enabled by control 106. Amplifier 94 could be disabled by control 110.

Figure 5:
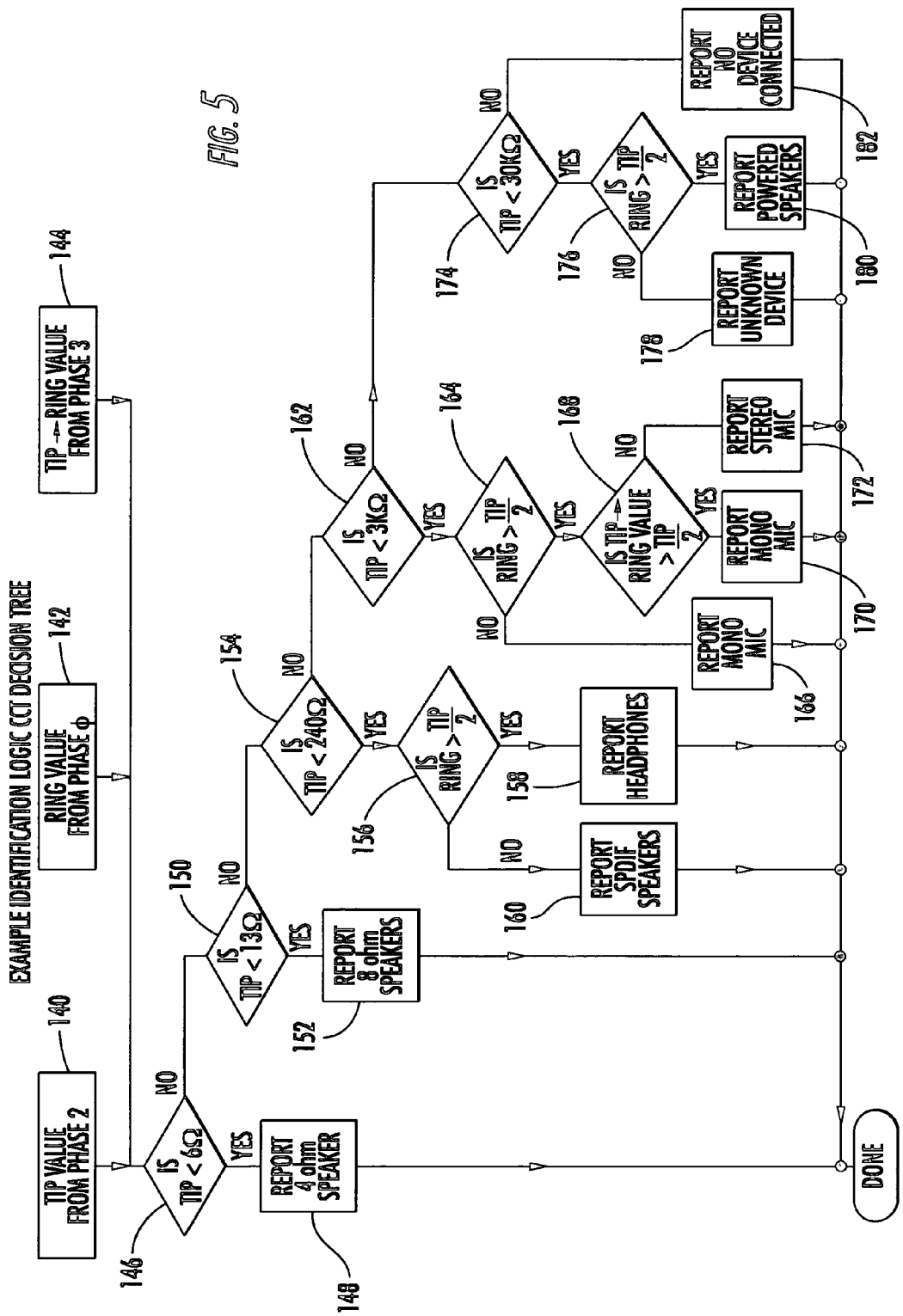
FIG. 5 is a schematic diagram of the decision tree logic which can be implemented in hardware and/or software.

If a line level input device is detected then there is no need for bias so switch 114 would be open and switch 116 would be closed. The conditions of amplifiers 88, 90, 92, and 94 and switches 96, 98, 100, and 102 would be the same as described for the stereo microphone case. The only exception would be that line level input signals are much larger than typical microphone levels. So, if amplifiers 92 and 94 had programmable gain control, this gain would be programmed to a lower value for a line level device than for a stereo microphone Data analysis logic circuit 132 may operate in accordance with the decision tree of FIG. 5. Inputs include the tip value 140 from phase 2, the ring value 142 from phase 1, and the tip ring value 144 from phase 3. The logic then queries as to whether the tip is less than 6 ohms for example, in step 146. If it is, then in step 148 it is reported that the unknown device is a 4 ohms speaker. If it is not less than 6 ohms, then the question is asked in step 150 as to whether the tip has a resistance of less than 13 ohms. If the answer is yes in step 152, it will be reported that the unknown device is an 8 ohm speaker. If the tip resistance impedance is not less than 13 ohms, the question is asked in step 154 as to whether the tip resistance is less than 240 ohms. If the answer is yes, a further inquiry is made in step 156 as to whether the ring impedance is larger than ½ of the tip impedance. If it is, then the unknown device is reported in step 158 as being headphones. If it is not, it is reported in step 160 as being SPDIF or digital speakers. If in step 154 the tip was found to be not less than 240 ohms, the inquiry is made as to whether it is less than 3,000 ohms in step 162. If it is, inquiry is made as to whether the ring is larger than ½ of the tip impedance in step 164. If it is not, the decision is made in step 166 that the unknown device is a mono microphone. If the ring is larger than ½ of the tip impedance than the question is asked as to whether the tip ring impedance is greater than ½ of the tip impedance value in step 168. If it is, then in step 170 the unknown device is reported as being another type of mono microphone. But if in step 168 the tip to ring impedance value is not greater than ½ of the tip impedance, then in step 172 the device is identified as a stereo microphone. If it is determined that the tip is not less than 3,000 ohms in step 162, then inquiry is made in step 174 as to whether the tip is less than 30,000 ohms. If it is, inquiry is made in step 176 as to whether the ring impedance is greater than ½ of the tip impedance. If it is not, then in step 178 the device is reported as unknown. If it is, then in step 180 the device is reported as power speakers. If the tip is not less than 30,000 ohms than the decision is made in step 182 that no device is connected to the terminal or jack.

Figure 6:
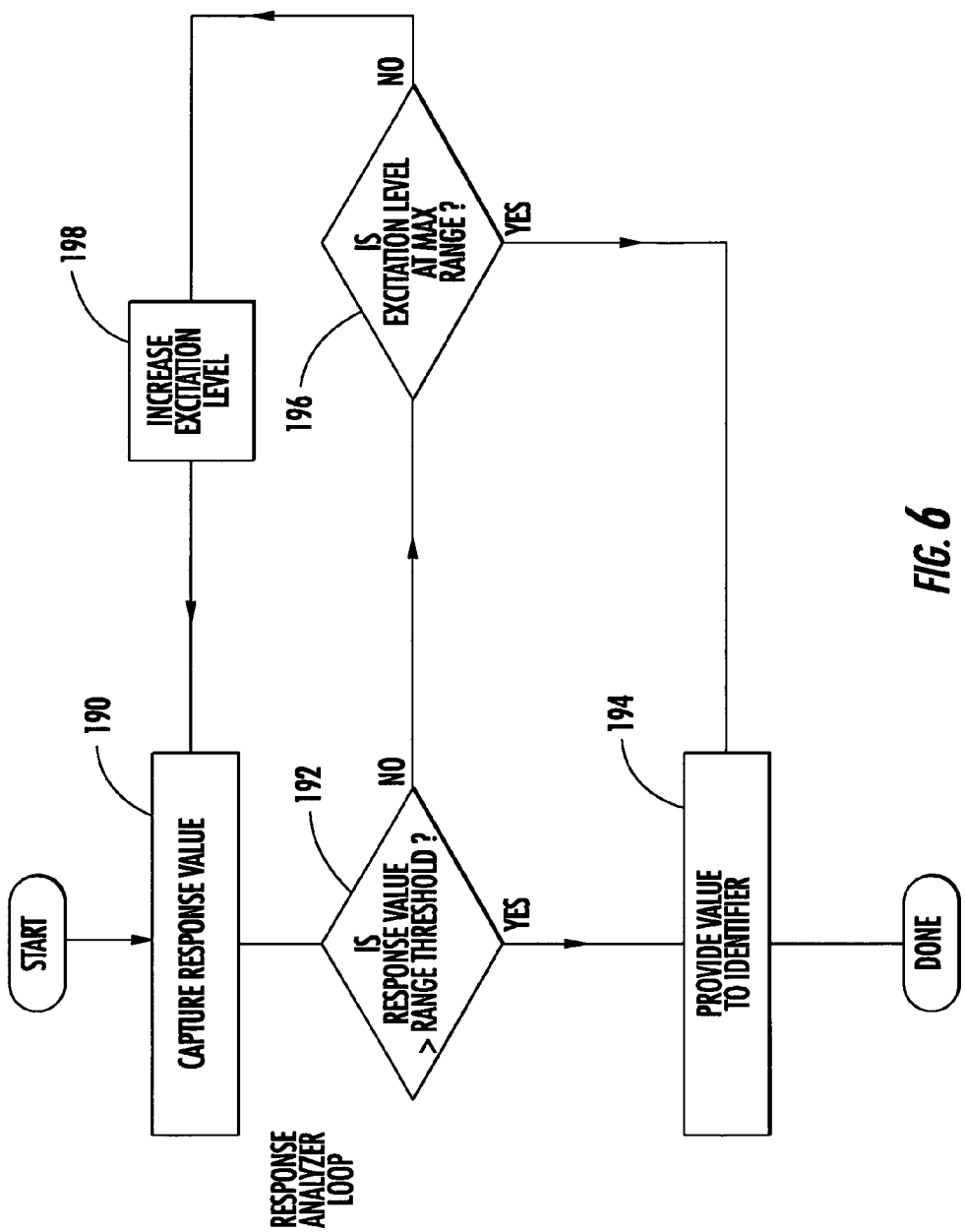
FIG. 6 is a schematic diagram of the control logic in the data analysis logic circuit of FIG. 4 for operating the programmable circuit source in the excitation circuit of FIG. 4.

The output on line 134 that successively boosts the current step output of current source 118 is developed in data analysis logic circuit 132 in accordance with the logic that is shown in FIG. 6 which begins with capturing a response value from the analog to digital converter 124 in step 190 and determining whether the response value is greater than the range threshold in step 192. If it is then that value is provided to the data analysis logic circuit in step 194. If the response value is not larger than the range threshold in step 192 then inquiry is made in step 196 as to whether the excitation level is at maximum range. If it is, the system simply returns to step 194 and provides the value to the identifier and the loop is done. However, if it is not at the maximum range the excitation level is increased in step 198 and the cycle begins again.

Figure 7:
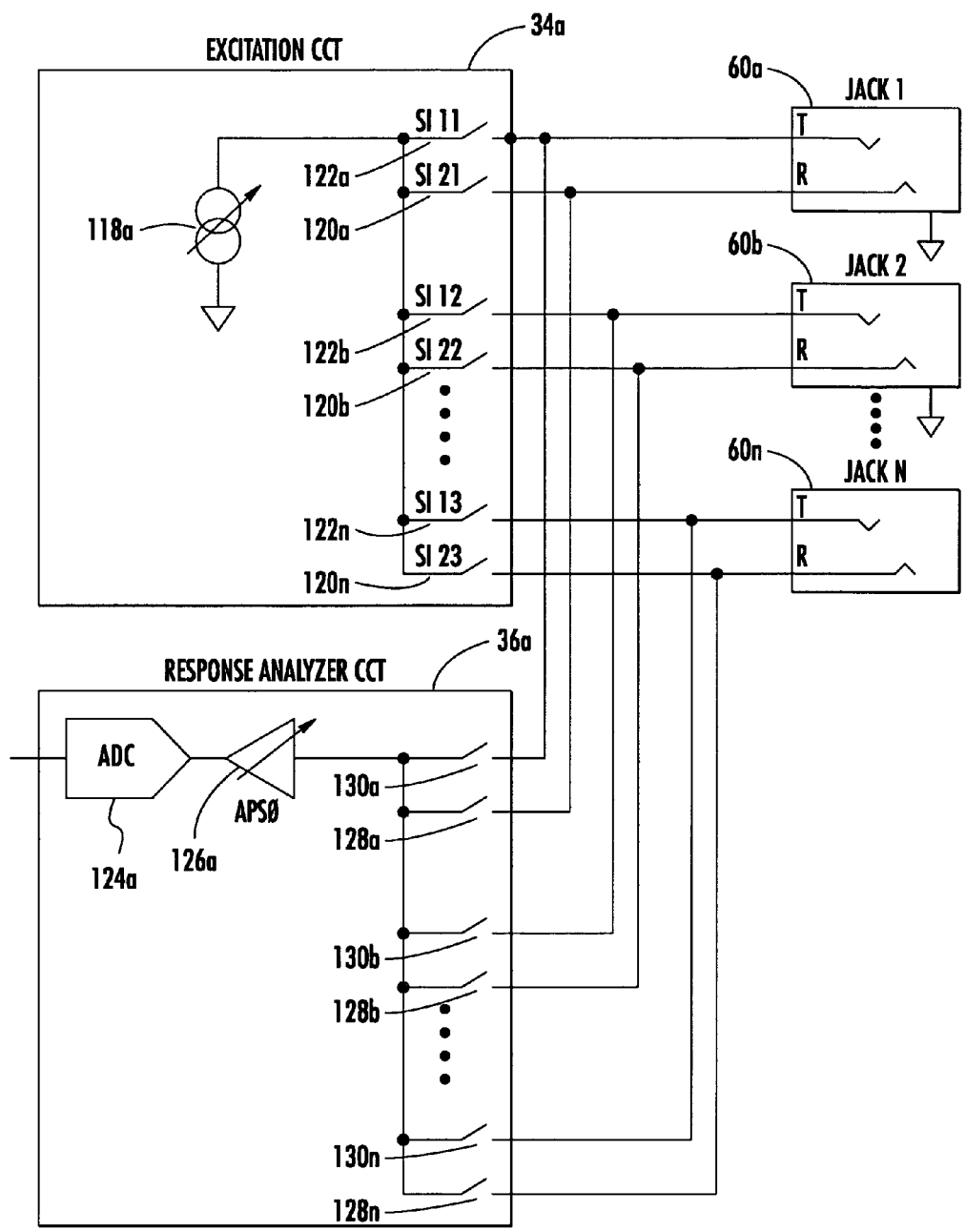
FIG. 7 is a schematic diagram showing switching circuits for multiplying the excitation and response analyzer circuits with a number of terminals or jacks.

Although in FIG. 4 there is a single jack 60 serviced by a single excitation circuit 34 and a single response analyzer circuit 36, this is not a necessary limitation of the invention. For example, there can be a number, and typically are, a number of terminals or jacks each one serviced by its own response analyzer 36 and excitation circuit 34 or, as shown in FIG. 7, a single excitation circuit 34a may include a single current source 118a which is multiplexed using a number of switches 120a, 122a, 120b, 122b, 120n, 122n, for servicing a number of jacks 60a, 60b, 60n. Likewise, response analyzer circuit 36a may have a single analog to digital converter 124a and amplifier 126a with a number of switches 128a, 130a-128n, 130n. In this way, the single current source 118a and the single ADC 124a, and amplifier 126a may service a multitude of terminals such as audio jacks 60a through 60n.

Figure 8:
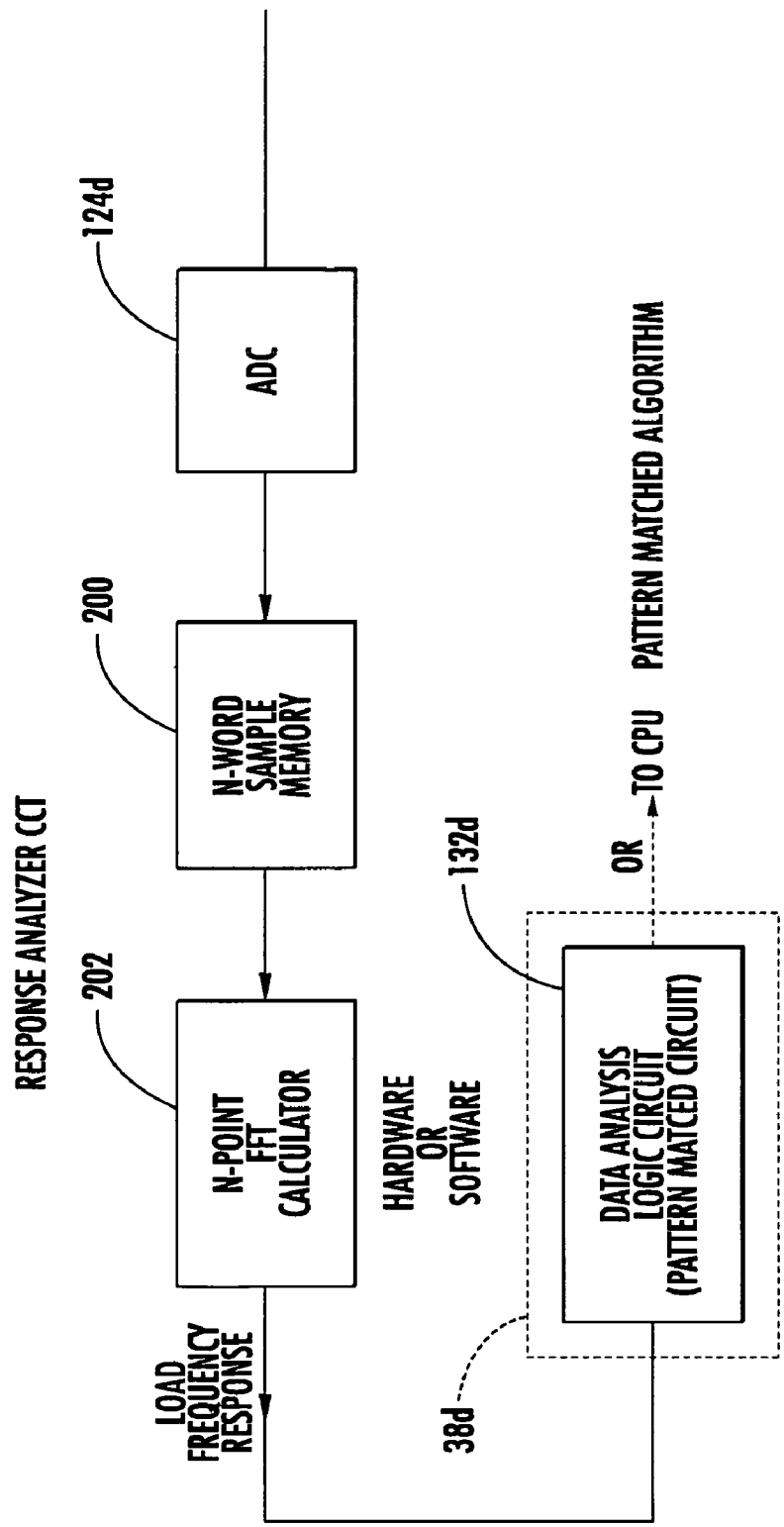
FIG. 8 is a schematic block diagram of response analyzer circuit which matches spectral signatures.

The impedance characteristic is not the only electrical characteristic of an unknown load that can be matched with the electrical characteristics of known loads or devices. For example, the frequency response of the unknown device could be matched with the frequency responses of known devices. In that case the output from ADC 124d, FIG. 8, may be supplied to an N word sample memory 200 which delivers the signal to an N-point fast Fourier transform, FFT calculator 202. From there the output is delivered to identification circuit 132 which may, for example, be data analysis logic circuit 132 or some other pattern matching circuit 132d which then provides the identification output. Alternatively, the output could be delivered directly to a CPU for manipulation using pattern matching algorithms. In fact, the function of the N-word sample memory 200 and the N-point FFT calculator 202 could also be embodied along with the identification circuit 38d in a properly configured computer.

Figure 9A:
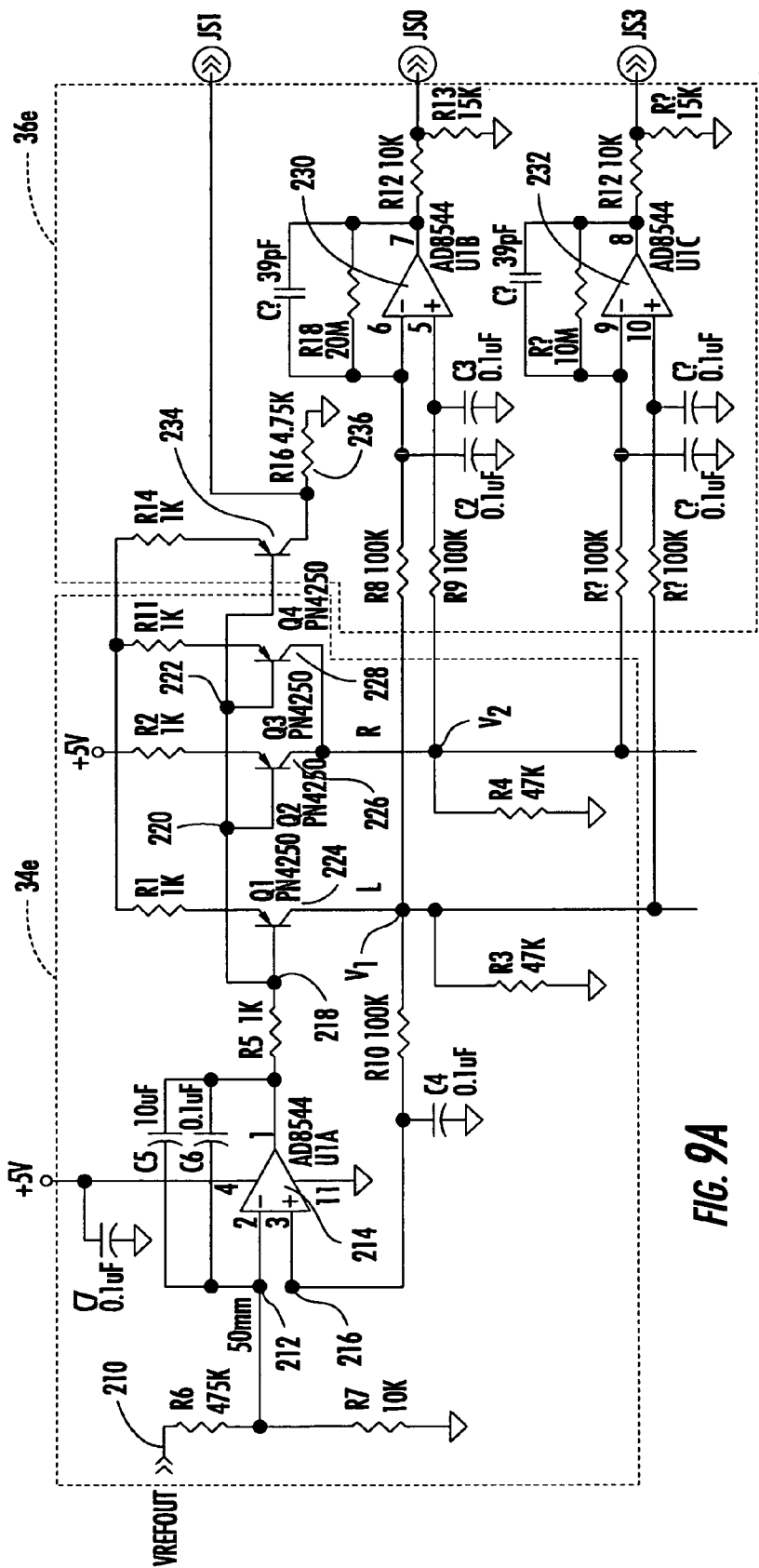
FIG. 9 is a more detailed schematic diagram of another implementation of the response analyzer circuit, excitation circuit, identification circuit, reconfiguration circuit, and support components of FIGS. 1 and 2.
Figure 9B:
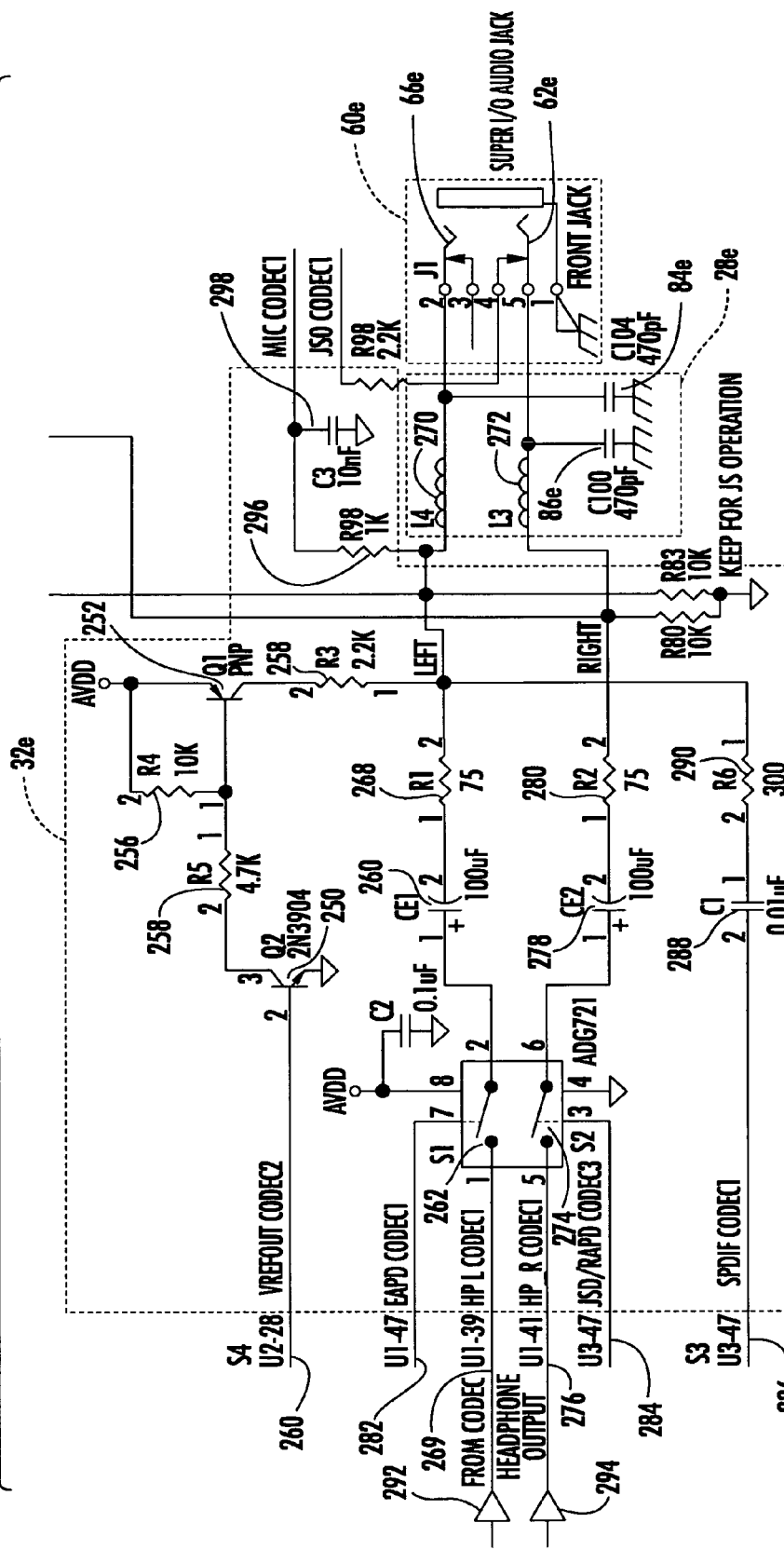

Instead of employing a decision tree, a simple storage look-up table could be used. For example, a signal at input 210, FIG. 9, provides a voltage, for example 50 millivolts, at input 212 to amplifier 214. The difference between the 50 millivolts at input 212 and the input at 216 causes an output signal that drives the bases 218, 220, 222 of current source mirrors 224, 226, and 228 to conduct. The current they conduct will increase until the inputs at 212 and 216 are balanced. Because two of the current mirrors 226 and 228 are connected to point V2 and only one is connected to point V1, V2 receives twice the current of V1. These two inputs, V1 and V2 are delivered to both amplifier 230 and amplifier 232. When V1 is equal to or greater than V2, output JS0 from amplifier 230 is equal to 0, otherwise, JS0 is 1. When V2 is greater than or equal to V1 then JS3, the output of amplifier 232 is 0, else JS3 is one. When V1 equals V2, JS0 is equal to 0 and JS3 is equal to 0. The greater the current flowing through V1 and V2, the lower the impedance present at jack 60e. The JS0 and JS3 outputs coupled with the JS1 output effects an identification of a number of different possible devices. The JS1 output is derived from yet another current mirror 234 whose output is converted to a voltage by virtue or a resistance 236 and delivered to the output JS1. If the voltage is high, meaning the current was high, then JS1 is 1 and a 1 here or a high voltage here indicates a low impedance.

The identification process can be understood more readily with reference to the jack sensing table in FIG. 10 where it can be seen that such devices as speakers, headphones, mono headsets, SPDIF or digital speakers, telecommunications devices or a microphone respectively, are represented by a distinctive three-bit digital code as listed in the columns JS1, JS3, and JS0. An additional column JS4 is added which simply can be an output from the plug/unplug event detection circuit 40, FIG. 2, that indicates whether or not a plug is present in the jack. When it is JS4 is a 1, when there is nothing in the jack it is a 0. This gives the additional characterization of nothing when nothing is attached. In reconfiguration circuit 32e, FIG. 9, transistors 250 and 252 and resistors 254, 256 and 258 combine to form a programmable microphone bias source controlled by the level on input 260. This will be activated when a microphone or telecom headset is connected to audio jack 60e and detected, in order to provide bias on the tip terminal 66e. The programmable bias will be deactivated, by input 260 being grounded, when a headphone, or analog or digital speaker is detected. Switch 262 conditionally connects the left headphone output signal 264 to capacitor 266 which couples this signal to the audio jack 60e tip terminal 66e through resistor 268 and inductor 270. Inductors 270 and 272 combine with capacitors 84e and 86e, respectively, to form a two-channel high frequency EMI filter. This filter is optional and inductors 270 and 272 could be replaced by short circuits. Switch 274 conditionally connects the right channel headphone output signal 276 to capacitor 278 which couples this signal to the ring terminal 62e of audio jack 60e through resistor 280 and inductor 272.

When analog speakers, mono headset, or headphones are detected, switches 262 and 274 are closed by activating signals on inputs 282 and 284, respectively. Signal 260 would be grounded ensuring no bias applied. The SPDIF output signal 286 would be either grounded or high impedance. When digital (SPDIF) speakers are detected the conditions are the same except that an SPDIF signal is sent to the jack 60e through capacitor 288 and resistor 290 also the amplifiers 292, 294 whose outputs are connected to terminals 264 and 276 are placed in a muted state thus ensuring no interfering signals are presented to the jack 60e and also providing AC termination for the SPDIF signal using components 266 and 268. For a telecom headset, 260 is set to a high level to provide bias to the headset microphone connected to terminal 66e. Switch 262 is open to ensure the signal from the microphone is not significantly attenuated. This signal is presented for further processing through resistor 296 to the microphone input of an audio codec circuit. Capacitor 298 combines with resistor 296 to low pass filter the signal. This filtering is desirable but optional. Audio signal is provided to the earpiece of the telecom headset connected to the terminal 62e by closing switch 274 thus connecting the output amplifier attached to terminal 276. Input 286 is programmed to a high impedance state.

For a standard mono computer microphone input 260 is high for providing bias, switches 262 and 274 are open and the SPDIF output connected to input 286 is programmed to a high impedance state. The incoming microphone signal on terminal 66e is provided to the codec microphone input through inductor 270 and resistor 296.

Figure 11:
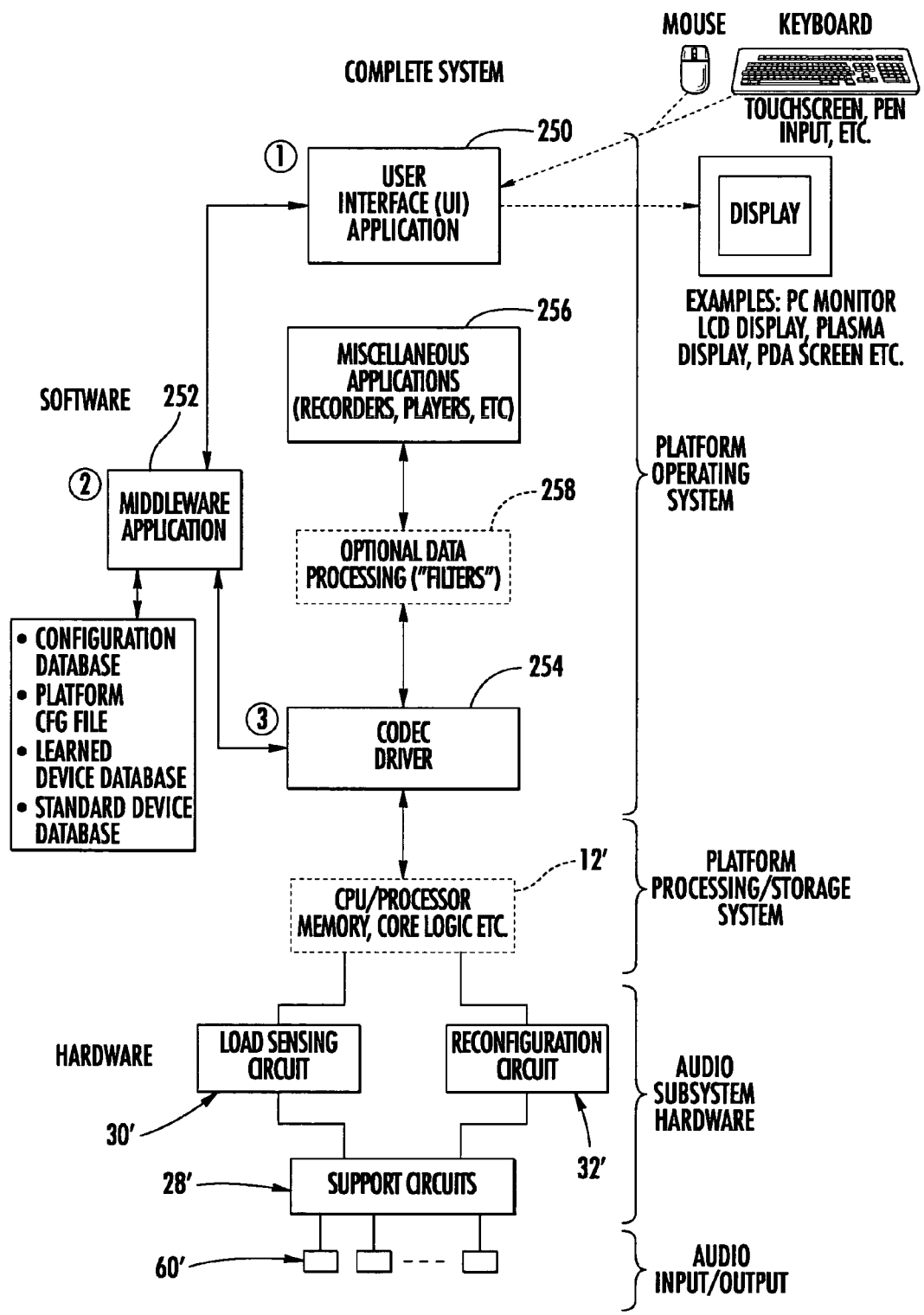
FIG. 11 is a schematic flow chart of the method/system according to this invention with software implementation.

In accordance with the method and system of this invention a complete system employs three main pieces of software, a user interface application 250, FIG. 11, middleware application 252, and codec driver software 254. User interface 250 interfaces with the user equipment such as computer 12, FIG. 1, where the software has already been referred to generally at 14. The user interface application can include a mouse, keyboard, touchscreen, pen, or any other sort of input as well as displays such as PC monitors, CCD displays, plasma displays, PDA screens and the like. Miscellaneous applications, such as recorders, players and others 256 can be delivered through data processing circuits 258, such as filters and the like, to codec driver 254. When load sensing circuit 30' determines from its engagement with support circuits 28' and jacks 60' that a particular device is connected, it delivers this information to the CPU processor 12' which delivers it to codec driver 254. Load sensing circuit 30' may deliver raw data from analog to digital converter 124, FIG. 4, directly to codec driver 254, FIG. 11, as well as the processed data from the data analysis logic circuit or other output of the response analyzer 36. In this way, codec driver 254 in conjunction with the CPU processor 12' can make a decision independent of that provided by load sensing circuit 30' using the raw data as well as the decision of load sensing circuit 30' to determine the identity of the unknown device and make its own decision as to the identity of the unknown device connected to jack 60'.

The middleware application 252 assists in this operation and also in conjunction with the user interface application 250 can add new devices to its database. When it can not recognize the attached device it may simply, through the user interface, ask the user what the device is and then store that identification along with the electrical characteristics such as impedance or spectral signature for future reference.

Figure 12:
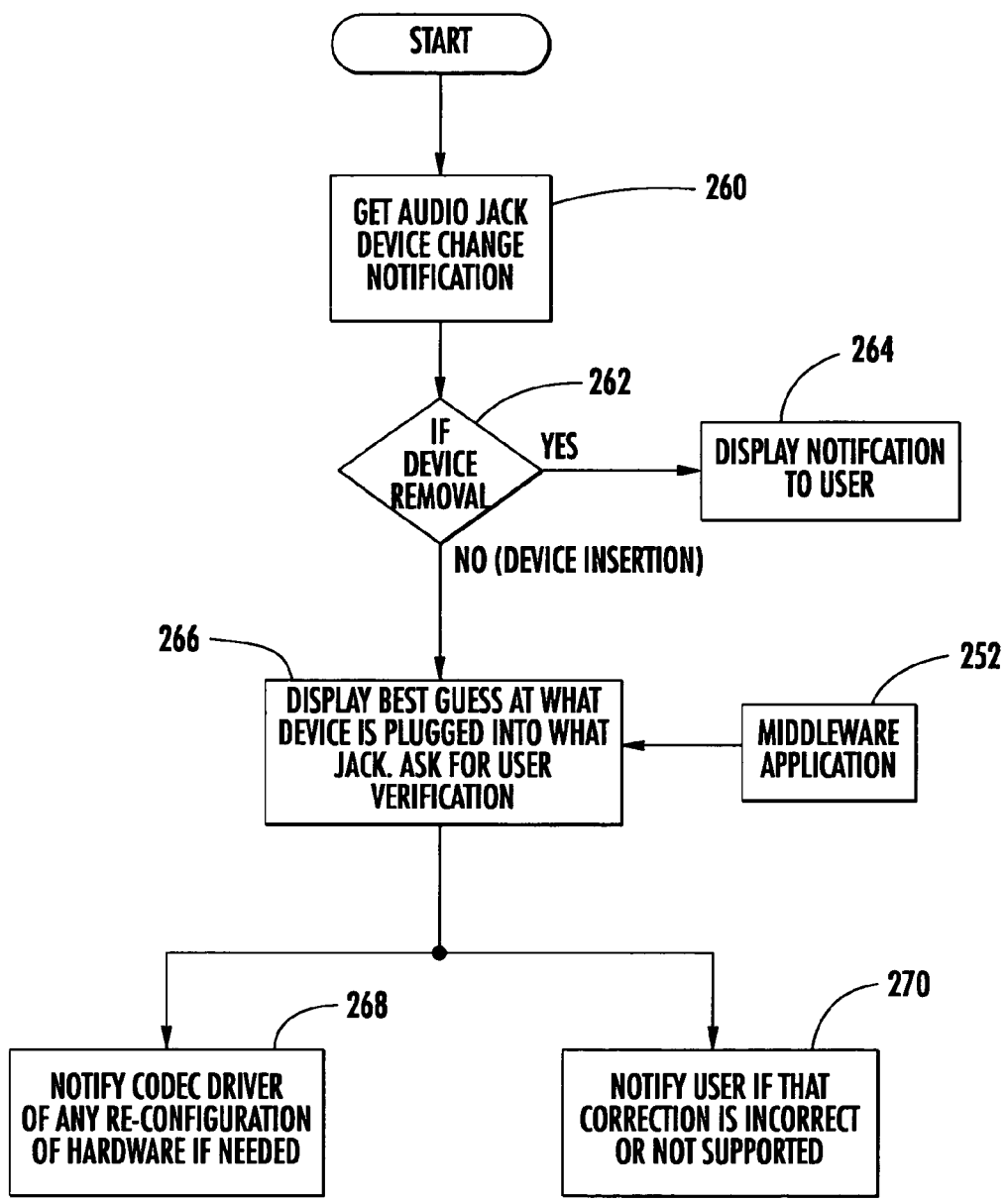
FIG. 12 is a schematic flow chart of the user interface according to this invention with software implementation.

User interface messaging begins with a task of getting the audio jack device change notification in step 260, FIG. 12. If there has been a device change, for example, if the device has been removed as queried in step 262, then in step 264 that notification is displayed to the user. If the answer is that there has been no device removal, then the system displays its best guess as to what device is plugged into what jack and can ask for user verification in step 266. Then the codec driver is notified in step 268 of the reconfiguration of the hardware if that is needed and the user is notified in step 270 if that correction is incorrect or is not supported.

Figure 13:
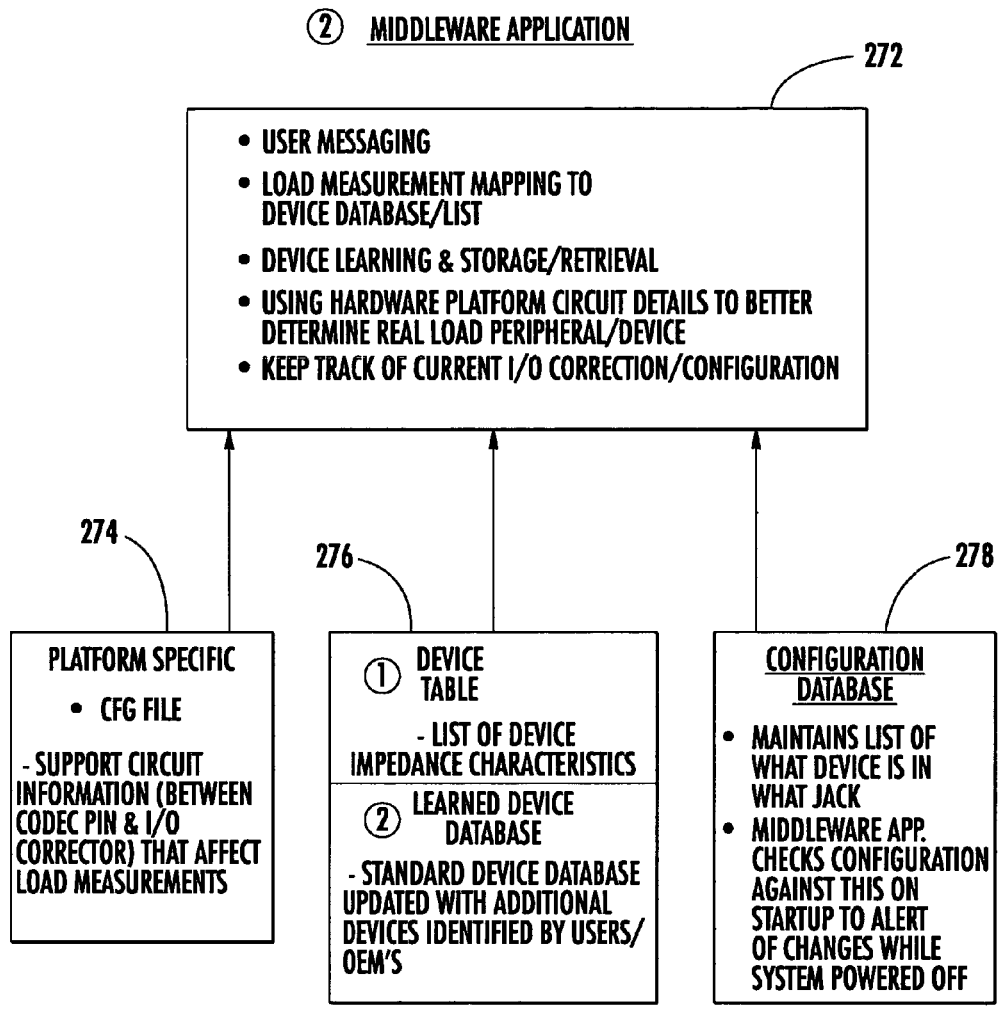
FIG. 13 is a schematic flow chart of the middleware application according to this invention with software implementation.

The middleware application performs a number of functions as indicated at 272, FIG. 13. It performs user messaging, load measurement, mapping to device database lists, device learning, and storage and retrieval functions. In addition it uses hardware platform circuit details to better determine the real load peripheral device over and above the identification given to it by the identification circuit. It also will keep track of the current I/O correction and configuration data. To perform this it maintains the support circuit information 274 and the configuration file so that, once identified, the proper circuitry can be reconfigured to adapt a terminal to a particular device connected there. It also contains 276 a database listing the standard device impedance characteristics and a learn device database of standard device database characteristics updated with additional devices identified by the user's own OEMs. Finally, its configuration database maintains a list of what device is in what jack and the middleware application checks the configuration against this at startup to detect of any changes while the system was powered off.

Figure 14:
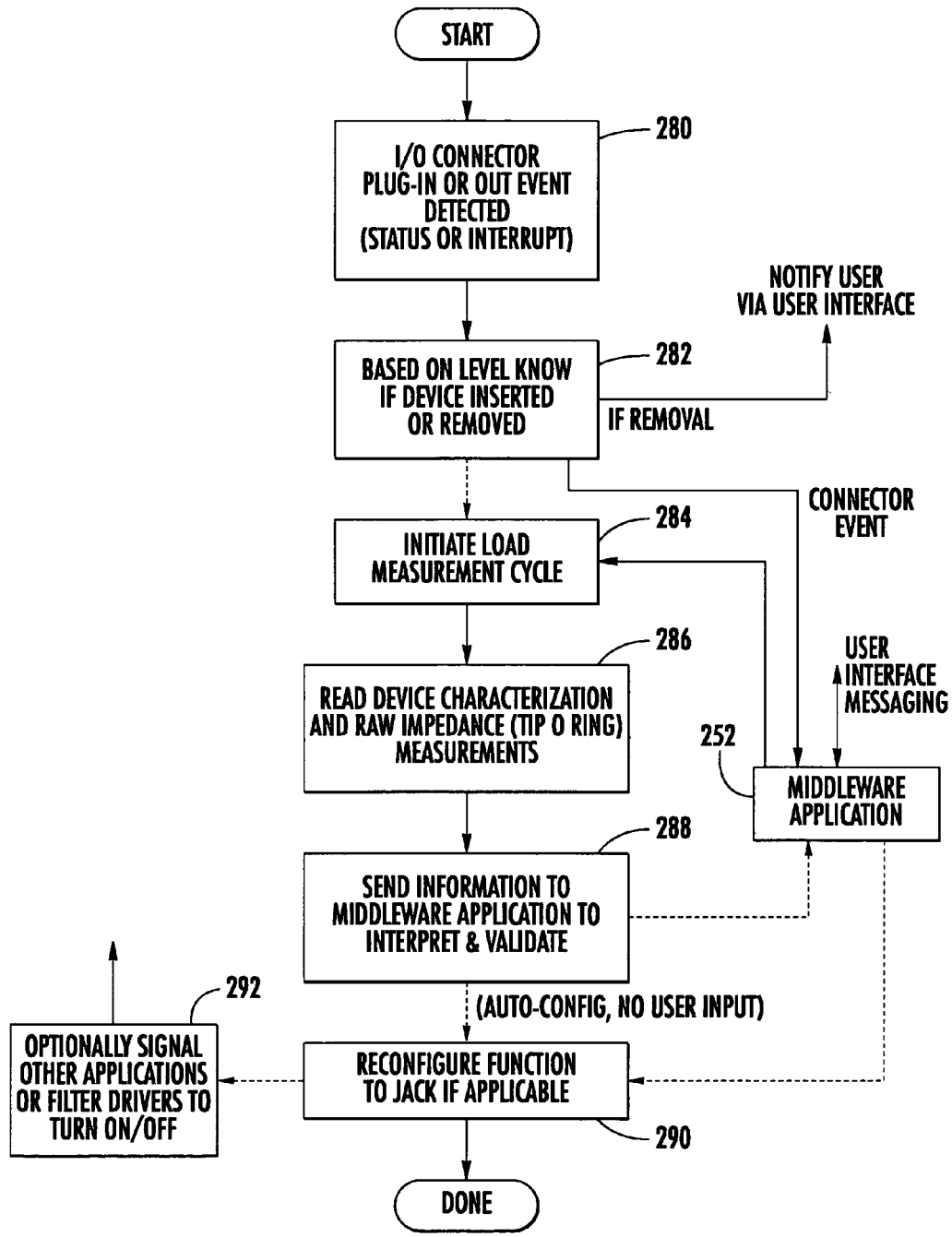
FIG. 14 is a schematic flow chart of the codec driver according to this invention with software implementation.

A codec driver detects any I/O connection plug in or plug out event 280, FIG. 14. The codec driver also knows for each jack whether a device has been inserted or removed based on the level read at that jack in step 282. If the device has been removed the user interface will be notified. After these preliminary events including communication of connector events with middleware application 252 and middleware applications communication to the user interface by messaging, the initial load measurement cycle is begun at step 284. The device characterization by the identification system and the raw impedance, tip or ring or both, are obtained 286. Information 288 is then delivered to the middleware application to interpret and validate the identification. At this point if it is necessary to reconfigure the jack to input or output or to particular impedance matching, this is done 290. Other applications and filter drivers can be turned on or off as desired at this option 292.

Figure 15:
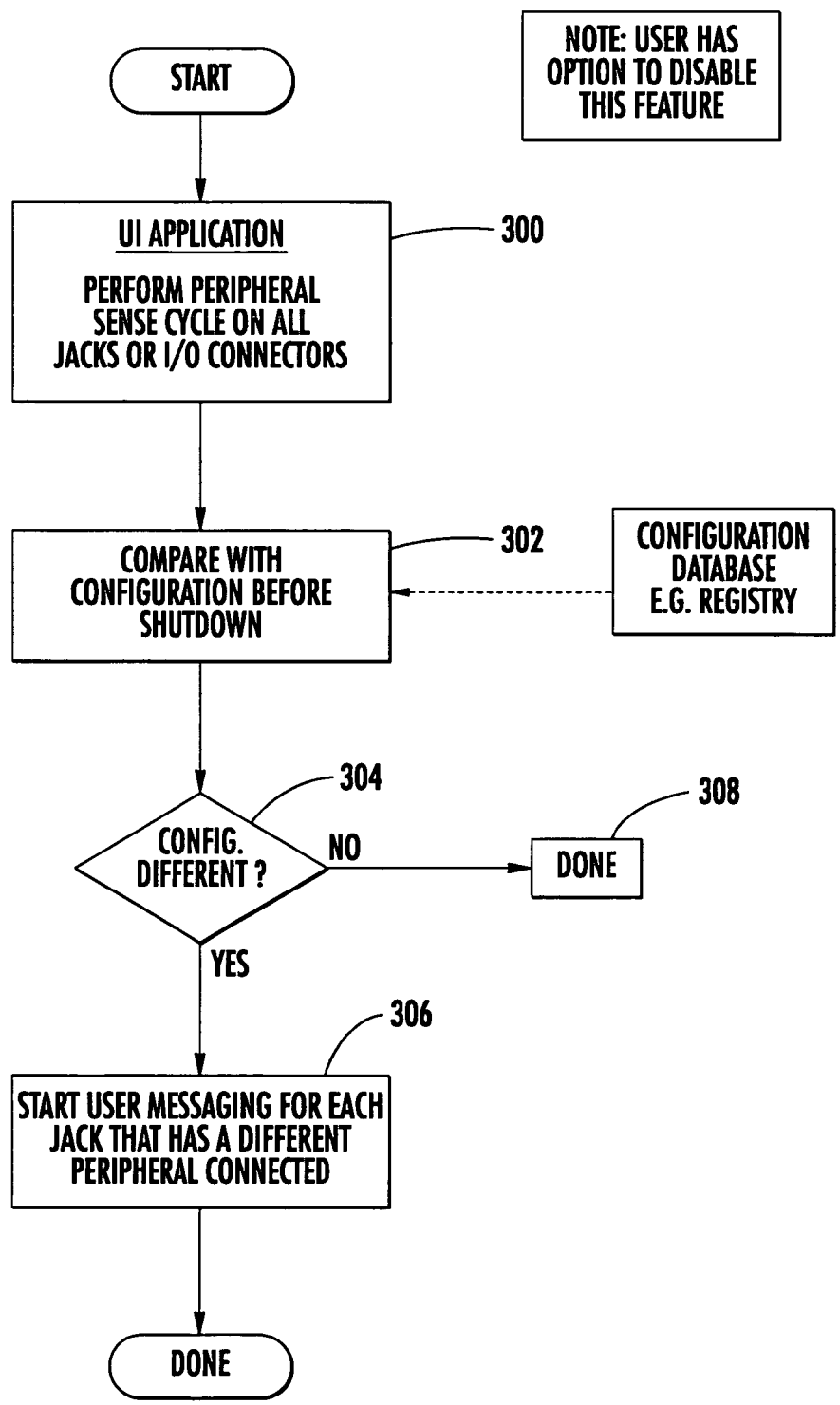
FIG. 15 is a schematic flow chart of the system start-up operation.

At startup, FIG. 15, the user interface application performs peripheral sensing cycle in all of the jacks or the I/O connectors 300 and compares 302 that with the configuration before shut down. If the configuration is different, step 304, then the user messaging is started for each jack that has a different peripheral connected 306. If nothing is changed the task is done.

Figure 16:
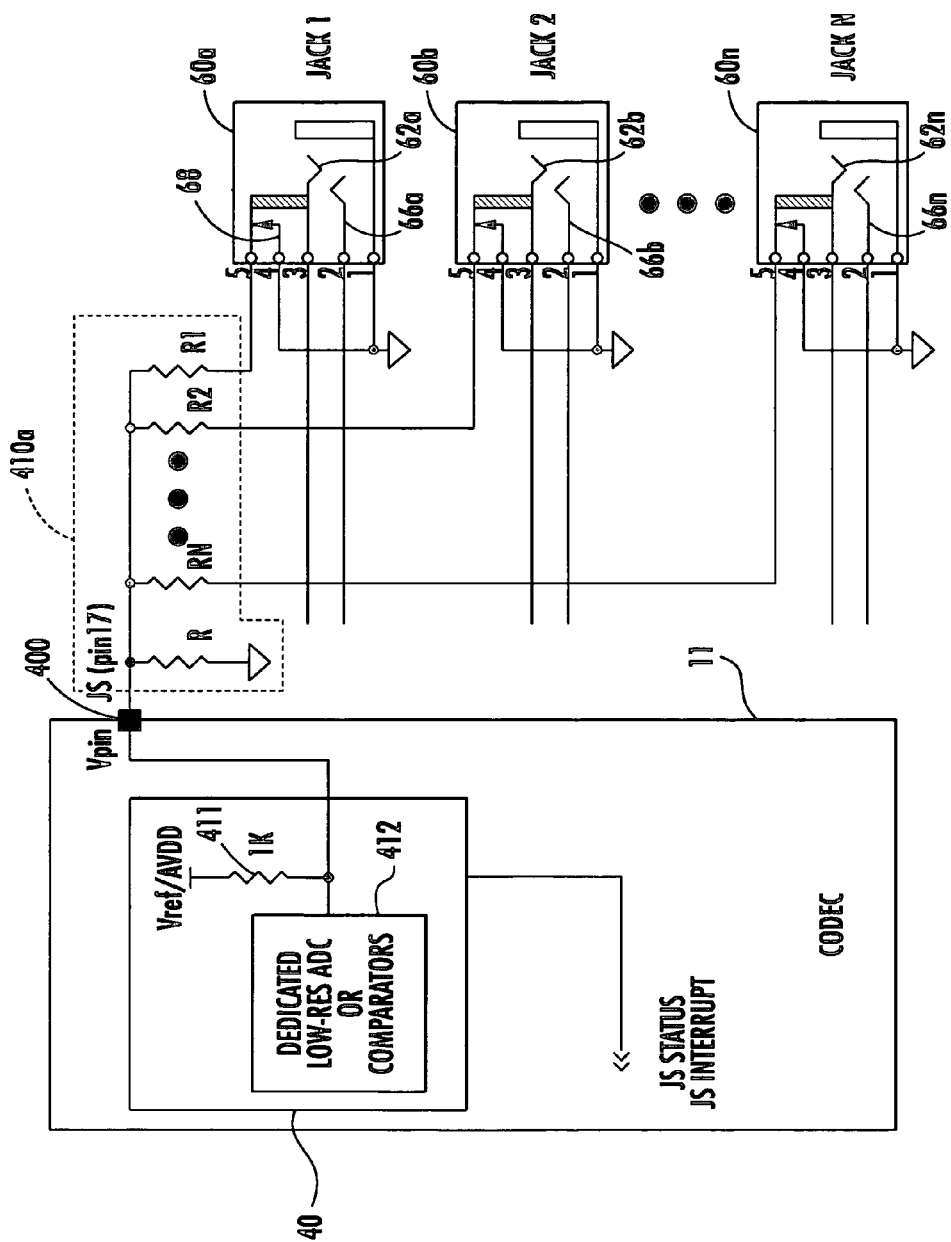
FIG. 16 is a schematic block diagram of an event detector in accordance with this invention particularly suited for use with isolated switches.

Jack event detection is the ability of a codec 11, FIG. 16, or other system in accordance with this invention to detect that a device is plugged into or unplugged from a jack in the system. The event detection mechanism then triggers a signal (e.g., CPU interrupt and post a status bit in a register for the system software to monitor) back to the system to take action and react as necessary. Reaction examples are down mix multi-channel audio to 2-channels and mute surround channels when plug in headphones, turn on or off EQ engine, measure the device characteristic of what is plugged in, and message the user.

For a single jack one DC voltage path from the jack switch pins to the codec and one codec pin (JS) is sufficient to detect events at that jack. Connecting the switch pin on the jack to the JS pin will result in a logic high or low (high via pull-up resistor in the codec, low via pull-down resistor in the applications circuit) depending on if something plugged into the jack or not. The transition from logic 'O' to logic '1' and vice versa is the event signal to the system.

Figure 17:
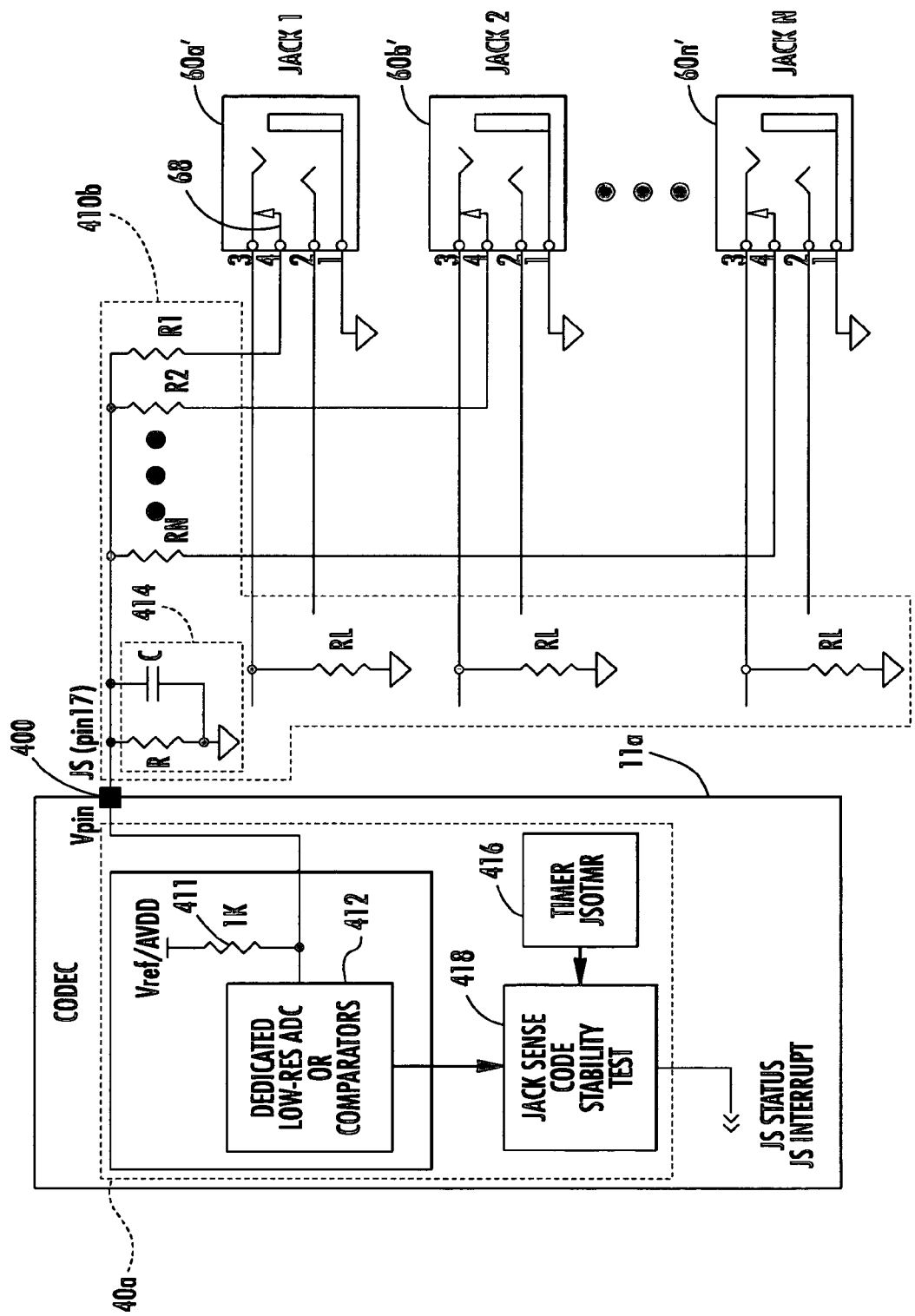
FIG. 17 is a schematic block diagram of an event detector in accordance with this invention particularly suited for use with non-isolated switches.

Typical systems have multiple jacks as shown in FIGS. 16 and 17 as jacks 60a-60n rather than having a dedicated pin per jack to detect events mechanisms. In essence, these systems include, in accordance with this invention, a resistive ladder network 410a, FIG. 16 or 410b, FIG. 17 that, depending on what is plugged into each jack (or not), the DC voltage level at JS pin node 400 will be different. The initial DC bias voltage is set via resistor 411 (e.g. 1 K) to the analog or digital supply voltage, inside or optionally outside codec 11 on the applications circuit. Inside codec 11, low resolution analog to digital converter (ADC) 412 measures the voltage on JS pin node 400. When the voltage level changes, a device was plugged into or removed from a jack 60 in the system connected to the resistor ladder network 410. ADC 412 sends the voltage measurement to software that determines what jack the event happened and if something was plugged in or out, based on the voltage level at JS pin node 400. Resistive ladder network 410 thus conditions the voltage as JS pin node 400 to vary depending on whether devices are connected to one or more terminals 60 typically by choosing differently valued resistors R1-RN.

FIG. 16 discloses an approach for a multi-jack system where the jack switches 60a-60n are isolated from the audio signal. Isolated jack switches mean that when closed (or open) they do not connect to the audio signal lines. In this case, the voltage to JS pin node 400 is DC only. Isolated jacks tend to be less common than non-isolated jacks. As explained above with reference to FIG. 3, a plug inserted into jack 60a causes switch 68 to open changing the voltage level as JS pin 400.

FIG. 17 discloses resistive ladder 410b for a multi-jack system 60a'-60n' where the jack switch is not isolated from the audio signal. In this case, when nothing is in the jack the switch pins short the JS pin 400 path to the audio signal lines. If audio is playing, e.g., from an input device, this audio signal rides along the DC voltage causing it to change. RC filter 414 at JS pin 400 will decouple at least some of the AC audio signal and drain it to ground. Any voltage ripple or changes still at pin 400 could be "decoupled" by timer 416 inside codec 11a with a timeout set such that jack event mis-detections caused by the residue audio riding the DC voltage will not occur. Logic circuit or means 418 is responsive to timer 416 and ADC 412 to check whether the output from ADC 412 has changed during a time period set by timer 416. If the ADC output continues to change over successive time periods, an audio signal is present and no JS interrupt signal is generated. Conversely if the ADC output has changed but remains stable, the JS interrupt signal is generated. This same solution could be used even with isolated jacks to reject noise.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An identification system for recognizing a device as one of a plurality of different types of devices connected to at least one terminal of an information handling system comprising:
    an excitation circuit for supplying a test signal to a device in a test mode;
    a response analyzer circuit responsive to the test signal being applied to said device in the test mode for measuring an electrical characteristic of said device;
    an identification circuit responsive to the measured electrical characteristic of said device for matching a stored representation of said electrical characteristic of said device with representations of the electrical characteristics of said plurality of devices for recognizing said device connected to the terminal as one of said plurality of different devices; and
    a reconfiguration circuit connected to said terminal and responsive to the identification of said device for reconfiguring circuitry connecting the identified device to the information handling system to adapt to the identified said device by selectively operating a switching circuit;
    an event detector for detecting the presence and absence of a device connected to a said terminal, the event detector including:
    a resistor ladder network connected between a node and the terminals for conditioning the voltage at the node to vary depending on whether devices are connected to one or more of the terminals; and
    a comparison circuit for detecting whether the voltage at the node has changed.

2. The identification system of claim 1 in which said excitation circuit includes a current source.

3. The identification system of claim 2 in which said current source provides current to said device.

4. The identification system of claim 2 in which said current source sinks current from said device.

5. The identification system of claim 2 in which said excitation circuit includes an excitation switching circuit for selectively connecting said current source to said terminal.

6. The identification system of claim 2 in which said current source includes a plurality of current source units.

7. The identification system of claim 2 in which said response analyzer circuit includes a sample and hold circuit for sensing the voltage of said device after said current source is connected to said device.

8. The identification system of claim 1 in which said identification circuit employs a decision tree for matching the representation of the electrical characteristic of said device with those of said plurality of different devices.

9. The identification system of claim 1 in which said identification circuit includes a storage device for storing representations of said characteristics of said plurality of devices for matching with said representation of said characteristic of said device.

10. The identification system of claim 1 in which said reconfiguration circuit includes input and output amplifiers and a reconfiguring switching circuit for selectively connecting said amplifiers to a said terminal.

11. The identification system of claim 1 in which said reconfiguration circuit includes input and output amplifiers having enable inputs which can selectively transition the amplifiers between low on-impedance and high off-impedance.

12. The identification system of claim 1 in which the comparison circuit includes an analog to digital converter.

13. The identification system of claim 1 in which the resistive ladder network includes a differently valued resistors connected between each terminal and the node.

14. The identification system of claim 1 in which the multiple terminals are not isolated and the event detector further includes means for discriminating between a voltage change at the node due to the presence of an audio signal and a terminal plug-in or plug-out event.

15. The identification system of claim 14 in which the means for discriminating includes a logic circuit responsive to a timer for detecting whether the voltage change at the node is stable.

16. The identification system of claim 1 in which said electrical characteristic is impedance.

17. The identification system of claim 1 in which said electrical characteristic is frequency response and said response analyzer circuit includes a frequency response analyzer.

18. The identification system of claim 1 in which there are a number of terminals and a number of excitation switching circuits for selectively connecting said excitation circuit with each of said terminals.

19. The identification system of claim 1 in which said terminal includes a tip and ring jack, said excitation circuit supplies a test signal to the tip contact and said response analyzer circuit is responsive to the ring contact.

20. The identification system of claim 1 in which said terminal includes a tip and ring jack, said excitation circuit supplies a test signal to the ring contact and said response analyzer circuit is responsive to the tip contact.

21. The identification system of claim 1 in which said response analyzer circuit includes an analyzer switching circuit for selectively connecting said sample and hold circuit to said terminal.

22. The identification system of claim 1 in which there are a number of terminals and analyzer switching circuits for selectively connecting said response analyzer circuit with each of said terminals.

23. The identification system of claim 1 in which said excitation circuit includes a programmable current source responsive to said response analyzer circuit for selectively supplying a number of different current levels to said device.

24. An identification system for recognizing a device as one of a plurality of different types of devices connected to at least one terminal of an information handling system comprising:
 an excitation circuit for supplying a test signal to a device in a test mode;
 a response analyzer circuit responsive to the test signal being applied to said device in the test mode for measuring an electrical characteristic of said device;
 an identification circuit responsive to the measured electrical characteristic of said device for matching a stored representation of said electrical characteristic of said device with representations of the electrical characteristics of said plurality of devices for recognizing said device connected to the terminal as one of said plurality of different devices; and
 a reconfiguration circuit connected to a said terminal and responsive to the identification of a said device for reconfiguring circuitry connecting the identified device to the information handling system to adapt to the identified said device by selectively operating a switching circuit.

25. The identification system of claim 24 in which said identification circuit includes a decision tree for matching the representation of the electrical characteristic of said device with those of said plurality of different devices.

26. The identification system of claim 24 in which said identification circuit includes a storage device for storing representations of said characteristics of said plurality of devices for matching with said representation of said characteristic of said device.

27. The identification system of claim 24 in which said reconfiguration circuit includes input and output amplifiers and a reconfiguring switching circuit for selectively connecting said amplifiers to a said terminal.

28. The identification system of claim 24 in which said reconfiguration circuit includes input and output amplifiers having enable inputs which can selectively transition the amplifiers between low on-impedance and high off-impedance.

29. The identification system of claim 24 further including an event detector for detecting the presence and absence of a device connected to a said terminal.

30. The identification system of claim 24 in which said electrical characteristic is impedance.

31. The identification system of claim 24 in which said electrical characteristic is frequency response and said response analyzer circuit includes a frequency response analyzer.

32. The identification system of claim 24 in which there are a number of terminals and a number of excitation switching circuits for selectively connecting said excitation circuit with each of said terminals.

33. The identification system of claim 24 in which said terminal includes a tip and ring jack, said excitation circuit supplies a test signal to the tip contact and said response analyzer circuit is responsive to the ring contact.

34. The identification system of claim 24 in which said terminal includes a tip and ring jack, said excitation circuit supplies a test signal to the ring contact and said response analyzer circuit is responsive to the tip contact.

35. The identification system of claim 24 in which said response analyzer circuit includes an analyzer switching circuit for selectively connecting said sample and hold circuit to said terminal.

36. The identification system of claim 24 in which there are a number of terminals and analyzer switching circuits for selectively connecting said response analyzer circuit with each of said terminals.

37. The identification system of claim 24 in which said excitation circuit includes a programmable current source responsive to said response analyzer circuit for selectively supplying a number of different current levels to said device.

38. The identification system of claim 24 in which said excitation circuit includes a current source.

39. The identification system of claim 38 in which said current source provides current to said device.

40. The identification system of claim 38 in which said current source sinks current from said device.

41. The identification system of claim 38 in which said excitation circuit includes an excitation switching circuit for selectively connecting said current source to said terminal.

42. The identification system of claim 38 in which said current source includes a plurality of current source units.

43. The identification system of claim 38 in which said response analyzer circuit includes a sample and hold circuit for sensing the voltage of said device after said current source is connected to said device.

44. The identification system of claim 43 in which said response analyzer circuit includes an analog to digital converter responsive to said sample and hold circuit.

45. The identification system of claim 24 in which the comparison circuit includes an analog to digital converter.

46. The identification system of claim 24 in which the resistive ladder network includes a differently valued resistors connected between each terminal and the node.

47. The identification system of claim 24 in which the multiple terminals are not isolated and the event detector further includes means for discriminating between a voltage change at the node due to the presence of an audio signal and a terminal plug-in or plug-out event.

48. The identification system of claim 24 in which the means for discriminating includes a logic circuit responsive to a timer for detecting whether the voltage change at the node is stable.

49. An identification method for recognizing a device as one of a plurality of different types of devices connected to at least one terminal of an information handling system comprising:
supplying a test signal to a device in a test mode;
measuring an electrical characteristic of said device in response to the test signal being applied to said device in the test mode;
matching a representation of said electrical characteristic of said device with stored representations of the electrical characteristics of said plurality of devices for recognizing said device connected to the terminal as one of said plurality of different devices; and
reconfiguring said terminal to adapt to the identified said device by selectively operating a switching circuit.

50. The identification method of claim 49 in which matching the representation of the electrical characteristic of said device with those of said plurality of different devices employs a decision tree.

51. The identification method of claim 49 in which a storage device stores representations of said characteristics of said plurality of devices for matching with a said representation of said characteristic of said device.

52. The identification method of claim 49 further including an event detector for detecting the presence and absence of a device connected to a said terminal.

53. The identification method of claim 49 in which said electrical characteristic is impedance.

54. The identification method of claim 49 in which said electrical characteristic is frequency response.

55. The identification method of claim 49 in which a said terminal includes a tip and ring jack, said test signal is applied to the tip contact and the response is received from the ring contact.

56. The identification method of claim 49 in which a said terminal includes a tip and ring jack, said test signal is applied to the ring contact and the response is received from the tip contact.

57. The identification system of claim 49 in which said excitation circuit includes a programmable current source responsive to said response analyzer circuit for selectively supplying a number of different current levels to said device.

58. A system for detecting a device plug-in or plug-out event for a plurality of terminals, the system comprising:
a resistive ladder network connected between a node and the terminals that varies a resistance in order to vary the voltage at the node based on devices connected to one or more of the terminals;
a comparison circuit for detecting whether the voltage at the node has changed; and
a logic circuit, configured to discriminate between a voltage change at the node not due to a terminal plug-in or plug-out event and a voltage change at the node due to a terminal plug-in or plug-out event.

* * * * *